United States Patent
Huang et al.

(10) Patent No.: US 10,932,147 B2
(45) Date of Patent: Feb. 23, 2021

(54) GAP-BASED CELL MEASUREMENT IN WIRELESS COMMUNICATION SYSTEM

(71) Applicant: MEDIATEK INC., Hsinchu (TW)

(72) Inventors: Dinhwa Huang, Hsinchu (TW); Yih-Shen Chen, Hsinchu (TW); Tsang-Wei Yu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/366,457

(22) Filed: Mar. 27, 2019

(65) Prior Publication Data
US 2019/0306734 A1 Oct. 3, 2019

Related U.S. Application Data

(60) Provisional application No. 62/650,624, filed on Mar. 30, 2018.

(51) Int. Cl.
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
CPC .............................. H04W 24/08; H04W 24/10
See application file for complete search history.

(56) References Cited

U.S. PATENT DOCUMENTS

| 9,246,528 | B2 | 1/2016 | Yin | |
|---|---|---|---|---|
| 2013/0238664 | A1* | 9/2013 | Hsu | ........................ G06F 16/283 707/797 |
| 2015/0147993 | A1 | 5/2015 | Yin | |
| 2016/0100404 | A1* | 4/2016 | Han | ............................ H04L 5/00 370/329 |
| 2016/0262000 | A1* | 9/2016 | Koorapaty | ............. H04W 48/12 |
| 2016/0262100 | A1* | 9/2016 | Larsson | ............. H04W 52/0229 |
| 2017/0303187 | A1 | 10/2017 | Crouthamel et al. | |
| 2018/0176810 | A1* | 6/2018 | Thangarasa | ............. H04L 5/001 |

(Continued)

FOREIGN PATENT DOCUMENTS

WO   WO 2014/107882 A1   7/2014

OTHER PUBLICATIONS

International Search Report and Written Opinion dated Jun. 28, 2019 in PCT/CN2019/080539, 9 pages.

(Continued)

*Primary Examiner* — Alpus Hsu
*Assistant Examiner* — Camquyen Thai
(74) *Attorney, Agent, or Firm* — Oblon, McClelland, Maier & Neustadt, L.L.P.

(57) ABSTRACT

A method can include receiving measurement configurations for measuring serving/neighboring cells at a user equipment (UE) in a wireless communication system. The measurement configurations can indicate multiple measurement objects (MOs) each with a SSB measurement timing configuration (SMTC) specifying a sequence of SMTC window durations (i.e. SMTC occasions), and a sequence of gap occasions. The MOs can be measured within the SMTC occasions that overlap the gap occasions. The method can further include determining a carrier-specific scaling factor for a target MO in the multiple MOs based on candidate MOs to be measured in each of the gap occasions.

20 Claims, 9 Drawing Sheets

(56) References Cited

U.S. PATENT DOCUMENTS

| | | | | |
|---|---|---|---|---|
| 2018/0192432 A1* | 7/2018 | Tenny | ............... | H04W 72/1289 |
| 2018/0213427 A1* | 7/2018 | Uemura | ................ | H04W 24/10 |
| 2019/0069256 A1* | 2/2019 | Jung | ................ | H04W 56/0015 |
| 2019/0159148 A1* | 5/2019 | Jung | ................... | H04J 11/0069 |
| 2019/0182900 A1* | 6/2019 | Cui | ................... | H04W 72/0453 |
| 2019/0223216 A1* | 7/2019 | Siomina | ............ | H04W 74/0808 |
| 2020/0137601 A1* | 4/2020 | Siomina | ................ | H04W 24/10 |

OTHER PUBLICATIONS

"Scaling Factor for Measurement on Multiple Frequency Layers" Samsung, 3GPP TSG-RAN WG4 Meeting AH-1801, 2018, 3 pages.

"Remaining issues on intra frequency measurement requirements with measurement gap" NTT DOCOMO, Inc., 3GPP TSG RAN WG4 Meeting #86, 2018, 5 pages.

Combined Taiwanese Office Action and Search Report dated Jan. 22, 2020 in Patent Application No. 108111167 (with English translation of categories of cited documents), 7 pages.

"Scaling for measurements of multiple frequency layers with gaps", Ericsson, 3GPP TSG-RAN WG4 Meeting #85, R4-1712486, 2017, 4 pages.

Taiwanese Office Action dated Jul. 30, 2020 in Patent Application No. 108111167, 5 pages.

\* cited by examiner

GAP-BASED CELL MEASUREMENT IN WIRELESS COMMUNICATION SYSTEM

INCORPORATION BY REFERENCE

This present disclosure claims the benefit of U.S. Provisional Application No. 62/650,624, "Method of Gap-based Cell Measurement" filed on Mar. 30, 2018, which is incorporated herein by reference in its entirety.

TECHNICAL FIELD

The present disclosure relates to gap-based cell measurement in wireless communications.

BACKGROUND

In a New Radio (NR) wireless communication system, a mobile device can be configured with a measurement gap pattern to measure multiple frequency layers (measurement objects), including serving/neighboring cells from the intra-frequency layers where measurement need to be conducted within measurement gap or neighboring cells from inter-frequency layers and inter-RAT frequency layers. For example, synchronization signal blocks (SSBs) transmitted from the multiple frequency layers can be employed for radio resource management (RRM) measurement. The transmission of the SSBs can be confined in a specified time window, e.g. 5 ms time window. Periodicities of the SSB transmissions can be different from frequency layer to frequency layer.

SUMMARY

A method can include receiving measurement configurations for measuring multiple frequency layers (measurement objects) within gap occasions at a user equipment (UE) in a wireless communication system. The measurement configurations can indicate multiple measurement objects (MOs) each with a SSB measurement timing configuration (SMTC) specifying a sequence of SMTC occasions (SMTC window durations), and a sequence of gap occasions. The MOs can be measured within the SMTC occasions that overlap the gap occasions. The method can further include determining a carrier-specific scaling factor for a target MO based on the number of candidate MOs to be measured in each of the gap occasions.

In an embodiment, the MOs include one of a first intra-frequency MO to be measured with no measurement gap, where the SMTC occasions of the first intra-frequency MO overlapping the gap occasions, a second intra-frequency MO to be measured with measurement gaps, an inter-frequency MO, or an inter-radio access technology (RAT) MO.

In an embodiment, when no gap sharing scheme is indicated by the measurement configuration, or the measurement configuration indicates an equal splitting for gap sharing, the carrier-specific scaling factor for the target MO is determined according to a gap scheduling method that includes measuring the candidate MOs in each of the gap occasions with equal probability.

In an embodiment, when no gap sharing scheme is indicated by the measurement configuration, or the measurement configuration indicates an equal splitting for gap sharing, the one of the gap occasions, including a maximum number of candidate MOs among the gap occasions where the target MO is a candidate MO to be measured, is used to determine the carrier-specific scaling factor for this target MO, and the carrier-specific scaling factor for this target MO is the number of the candidate MOs in that gap occasion.

In an embodiment, the measurement configuration indicates a gap sharing scheme, and the carrier-specific scaling factor of the target MO can be determined according to a gap scheduling method that includes applying the gap sharing scheme (e.g., gap sharing factors) to the gap occasions each including at least an intra-frequency MO and at least an inter-frequency or inter-RAT MO, and not applying the gap sharing scheme (e.g., the gap sharing factors) to the gap occasions each including only intra-frequency MOs or only inter-frequency and inter-RAT MOs.

In an embodiment, the gap scheduling method can further include, in each of the gap occasions that each include at least an intra-frequency MO and at least an inter-frequency or inter-RAT MO, the intra-frequency MO(s) equally shares a first percentage of measurement opportunities, and the inter-frequency/inter-RAT MO(s) equally shares a second percentage of the measurement opportunities.

In an embodiment, the determining carrier-specific scaling factor of the target MO according to the gap scheduling method can include, when the target MO is an intra-frequency MO, counting a first number of intra-frequency MOs in each of the gap occasions including at least an intra-frequency MO and at least an inter-frequency or inter-RAT MO and where the target MO is a candidate MO, counting a second number of intra-frequency MOs in each of the gap occasions including only intra-frequency MOs and where the target MO is a candidate MO, and determining a third number to be the carrier-specific scaling factor of the target MO, the third number is a maximum number among the second numbers, and the first numbers each multiplied by an inverse of the first percentage.

In an embodiment, the determining the carrier-specific scaling factor of the target MO according to the gap scheduling method can include, when the target MO is an inter-frequency MO or an inter-RAT MO, counting a first number of inter-frequency/inter-RAT MOs in each of the gap occasions including at least an intra-frequency MO and at least an inter-frequency or inter-RAT MO, and where the target MO is a candidate MO, counting a second number of inter-frequency/inter-RAT MOs in each of the gap occasions including only inter-frequency/inter-RAT MOs and where the target MO is a candidate MO, and determining a third number to be the carrier-specific scaling factor of the target MO, the third number is a maximum number among the second numbers, and the first numbers each multiplied by an inverse of the second percentage.

In an embodiment, a set of gap occasion patterns each corresponding to a different combination of the MOs can be identified. When no gap sharing scheme is indicated by the measurement configuration, or the measurement configuration indicates an equal splitting for gap sharing, an inverse of an average of a sum of measured probabilities of the target MO in each of the gap occasion patterns where the target MO is a candidate MO is determined to be the carrier-specific scaling factor of the target MO. In an embodiment, the measured probabilities of the target MO is 1/N, and N is a number of candidate MOs in the respective gap occasion pattern.

In an embodiment, the measurement configuration indicates a gap sharing scheme. In an embodiment, when the target MO is an intra-frequency MO, the determining step of the method can include determining a first measured probability of the target MO in each of the gap occasion pattern including at least an intra-frequency MO and at least an inter-frequency or inter-RAT MO and where the target MO is a candidate MO, determining a second measured probability of the target MO in each of the gap occasion patterns including only inter-frequency or inter-RAT MOs and where the target MO is a candidate MO, and determining an inverse of an averaged measured probability to be the carrier-specific scaling factor of the target MO. The averaged measured probability is an average of the second measured probabilities and the first measured probabilities each multiplied by a first gap sharing percentage indicated by the measurement configuration.

When the target MO is an inter-frequency or inter-RAT MO, the determining step of the method can include determining a first measured probability of the target MO in each of the gap occasion pattern including at least an intra-frequency MO and at least an inter-frequency or inter-RAT MO and where the target MO is a candidate MO, determining a second measured probability of the target MO in each of the gap occasion patterns including only inter-frequency or inter-RAT MOs and where the target MO is a candidate MO, and determining an inverse of an averaged measured probability to be the carrier-specific scaling factor of the target MO. The averaged measured probability is an average of the second measured probabilities and the first measured probabilities each multiplied by a second gap sharing percentage indicated by the measurement configuration.

In an embodiment, a graph having a tree structure with nodes each representing a type of the SMTCs is constructed. Each type corresponds to a possible combination of periodicity and offset parameters of the SMTCs. The types are arranged in different layers, each layer corresponding to a value of the periodicities of the SMTCs with the layers corresponding to larger values arranged in higher layers. If the MOs corresponding to any two of the types in neighboring layers are candidate MOs in a same gap occasion, the two types in neighboring layers are connected with each other.

Aspects of the disclosure provide an apparatus. The apparatus can include circuitry configured to receive a measurement configuration for measuring neighboring cells at a UE in a wireless communication system. The measurement configuration can indicate multiple MOs each with a SMTC specifying a sequence of SMTC occasions, and a sequence of gap occasions. The MOs cab be measured within the SMTC occasions that overlap the gap occasions. The circuitry can further be configured to determine a carrier-specific scaling factor for a target MO in the MOs based on candidate MOs to be measured in each of the gap occasions.

Aspects of the disclosure provide a non-transitory computer-readable medium. The medium can store instructions that, when executed by a processor, cause the processor to perform the method of determining the carrier-specific scaling factor of the target MO.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
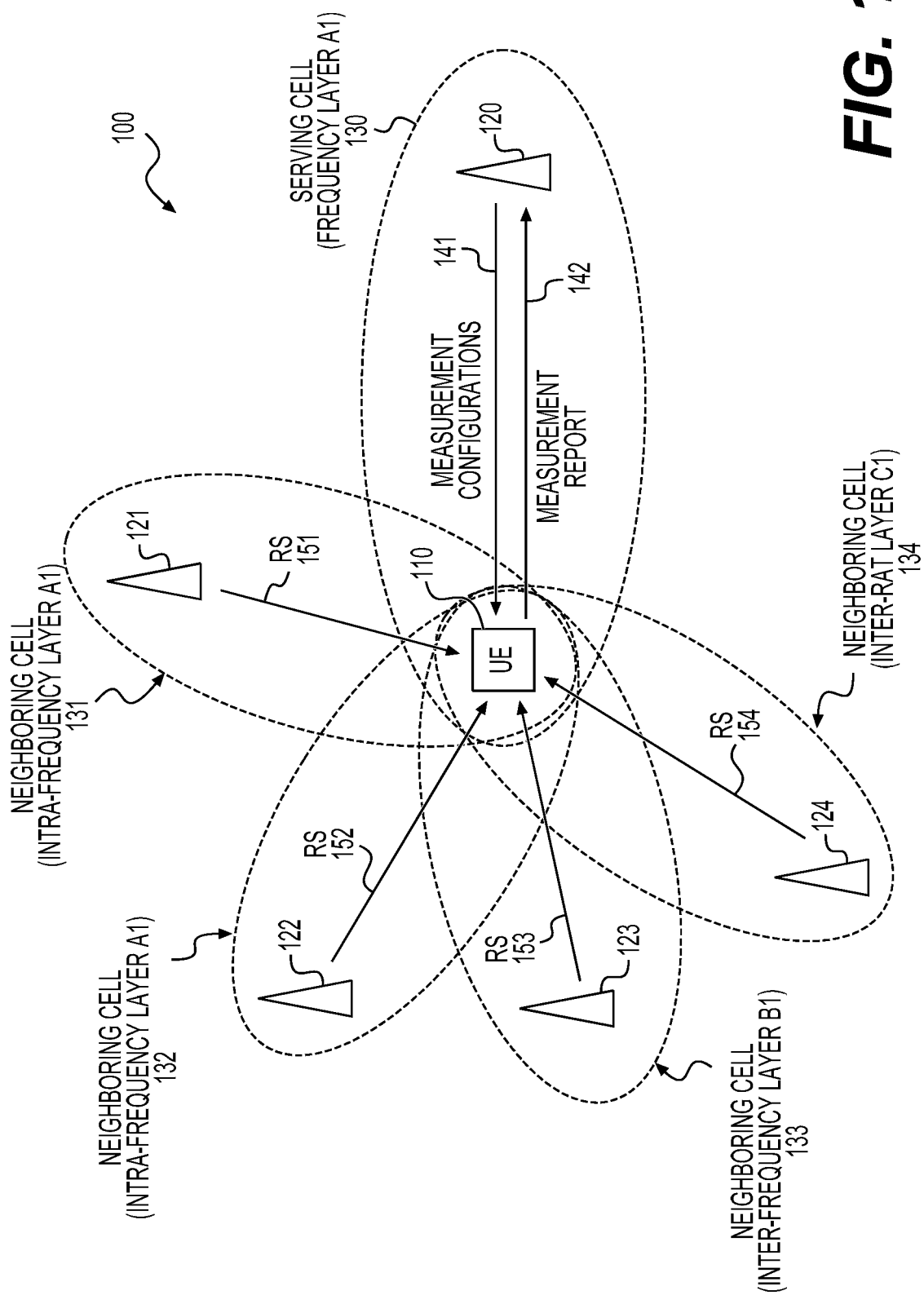
FIG. 1 shows a wireless communication system 100 according to some embodiments of the disclosure.

FIG. 1 shows a wireless communication system 100 according to some embodiments of the disclosure. The system 100 can include user equipment (UE) 110, and a plurality of base stations (BSs) 120-124. The UE 110 can be connected with the BS 120 (e.g., in radio resource control (RRC) connected mode), and operate on a serving cell 130 provided by the BS 120. The UE 110 can also be within coverage of a set of neighboring cells 131-134 provided by the BS 121-124, respectively.

In various embodiments, the BSs 120-124 may implement same or different radio access technologies, such as the New Radio (NR) air interface, the Evolved Universal Terrestrial Radio Access (E-UTRA) air interface, the Universal Terrestrial Radio Access Network (UTRAN) air interface, the GSM EDGE Radio Access Network (GERAN) air interface, and the like. Each BS 120-124 can implement functions of a gNB, a eNodeB, a Node B, or the like, specified by the respective standards developed or maintained by the 3rd Generation Partnership Project (3GPP). Accordingly, in an embodiment, the UE 110 can be a mobile device that can communicate with the BSs 120-124 according to respective communication protocols corresponding to the radio access technologies used by the respective BSs. Examples of the mobile device can include a mobile phone, a laptop computer, a vehicle carried communication device, and the like.

In an embodiment, based on a set of measurement configurations 141 received from the serving cell 130, the UE 110 conducts a measurement process to measure the serving cell 130 and the neighboring cells 121-124 and transmits a measurement report 142 to the BS 120. For example, the measurement configurations 141 can be transmitted to the UE 110 via radio resource control (RRC) signaling. For example, the measurement can be performed based on reference signals 151-154 transmitted from the BS 121-124 or reference signals (not shown) transmitted from the BS 130. The reference signals can be synchronization signal blocks (SSBs), channel state information (CSI) reference signals, or the like. The measurement configurations 141 may specify a set of to-be-measured intra-frequency layers (with serving/neighboring cells), inter-frequency layers (with neighboring cells), inter-RAT frequency layers (with neighboring cells). Those to-be-measured layers are referred to as measurement objects (MOs). The measurement configurations 141 may also specify a set of to-be-measured quantities corresponding to the MOs. For example, the measurement quantities can include reference signal received power (RSRP), reference signal received quality (RSRQ), signal-to-noise and interference ratio SINR, Reference signal time difference (RSTD), and the like.

In an example, with respect to the serving cell 130, the serving/neighboring cells 131-132 operate on an intra-frequency layer (e.g., inter-frequency layer A1 as shown in FIG. 1), and the neighboring cells 133-134 operate on inter-frequency layers or inter-RAT frequency layer (e.g., inter-frequency layer B1 and inter-RAT frequency layer C1). The measurement can include intra-frequency measurement performed on the intra-frequency layer A1 of cells 130-132, and inter-frequency or inter-RAT frequency measurement performed on the inter-frequency or inter-RAT frequency layer of cells 133-134. For example, according to the 3GPP NR standards, in a NR system, a measurement is defined as a SSB based intra-frequency measurement provided a center frequency of a SSB of a serving cell and a center frequency of a SSB of a neighboring cell indicated for measurement are the same, and subcarrier spacing of the two SSB are also the same. In contrast, a measurement is defined as a SSB based inter-frequency measurement if it is not a SSB based intra-frequency measurement.

In addition, in an embodiment, when the neighboring cell 134, for example, implements a radio access technology (RAT) different from a RAT of the serving cell 130, the measurement carried on the neighboring cell 134 can be an inter-RAT measurement.

In an embodiment, the measurement configurations 141 may further specify a measurement gap pattern for the measurement. For example, a set of parameters, including a gap pattern ID, a measurement gap length (MGL), a measurement gap repetition period (MGRP), and a measurement gap offset, can be provided such that timings of a sequence of measurement gaps (MG) can be determined and the time periods that UE 110 does not have to receive or transmit any data can be provided to the UE 110. The MG can also be referred to as a gap occasion, or a gap window duration. In one example, the MGRP takes one of the values among {20 ms, 40 ms, 80 ms, 160 ms}.

The UE 110 can use the MGs to identify and measure intra-frequency cells, inter-frequency cells, or inter-RAT cells. For example, the UE 110 can tune its radio frequency (RF) circuit away from the frequency layer of the serving cell 130 to the frequency layer of the inter-frequency/inter RAT neighboring cell 133 or 134 to perform cell search or measurement. For the measurement on the intra-frequency neighboring cells 131-132, in one example, the neighboring cells 131-132 can operate on the same frequency layer as the serving cell 130. However, the UE 110 may be a narrow band device without capability to cover the whole frequency band of the respective frequency layer configured for the serving cell 130. For example, the UE 110 operates on a bandwidth part (BWP) of the whole frequency band, and the BWP does not include the SSBs of the neighboring cells 131-132 indicated for measurement. Under such configuration, the UE 110 can similarly employ the MGs, and tune the RF circuit away from the BWP to measure the intra-frequency neighboring cells 131-132. During each MG, the UE 110 may not conduct reception/transmission from/to the serving cell 130. The UE 110 typically select one frequency layer of the neighboring cells 131-134 to monitor during one MG if the UE 110 does not have the capability to monitor multiple MOs at a time.

In an embodiment, the measurement configurations 141 may further include or indicate a set of SSB measurement timing configurations (SMTCs) for the measurement. Each SMTC includes a set of parameters that defines a sequence of measurement windows (referred to as SMTC occasions or SMTC window durations) for measuring one of the intra-frequency or inter-frequency/inter-RAT layers A1-C1 the neighboring cells 131-134 are operating on. For example, the parameters of the SMTC include a periodicity, a window duration, and an offset of the sequence of measurement windows. Based on the SMTC, the UE 110 can determine timings of the sequence of measurement windows. In this way, the measurement of the UE 110 on the respective cell is confined within a sequence of particular monitoring occasions. In one example, the SMTC is referred as SS block based RRM SSB measurement timing configuration (SMTC) when SSBs are used as reference signals for the measurement. In one example, window duration of the SMTC takes one of the values among {5 ms, 10 ms, 20 ms, 40 ms, 80 ms, 160 ms}.

In an embodiment, for intra-frequency measurement, up to two measurement window periodicities can be configured. The measurement configurations 141 can include information indicating which intra-frequency cell(s) is associated with which measurement window periodicities. For intra-frequency cells not specified in the measurement configurations 141, in one example, the longer measurement window periodicity is used. For inter-frequency measurement, in one example, a single SMTC is configured for each inter-frequency layer.

In an embodiment, the to-be-measured SSBs of the neighboring cell 131 are within the frequency range of the BWP of the serving cell 130. Accordingly, the neighboring cell 131 can be measured without MGs. However, the SMTC windows configured for measuring the neighboring cell 131 fully overlap the gap occasions specified by the measurement configurations. Under such a configuration, the measurement of the neighboring cell 131 is conducted during the configured gap occasions, and shares the configured gap occasions with the measurement of the other neighboring cells that is based on a same set of measurement gaps.

In some embodiments, based on information of the measurement gap configuration and the SMTCs configured for the set of serving cell 130 and neighboring cells 131-134, the UE 110 determines a measurement delay (also referred to as a measurement period) for the measurement of each serving cell 130 and neighboring cell 131-134 according to a derivation method. The measurement delay can indicate duration of a period needed for completing the measurement on the respective frequency layer considering gap occasions being shared by multiple MOs. The measurement delay derivation method can be predetermined, and known to both the UE 110 and the BS 120, such that the UE 110 and the BS 120 can have a common expectation of when the measurement of the respective frequency layers can be completed and the measurement result can be reported from the UE 110 to the BS. As an example, certain measurement delays (or periods) are specified in some 3GPP LTE and NR standards, and used as measurement performance requirements on UEs for conducting various types of measurement. Particular methods for calculating the measurement periods based on respective configuration information are described in the respective standards.

Aspects of the disclosure provide techniques and methods for determination of the measurement delays that may be used as measurement performance requirements on the UE 110.

Figure 2:
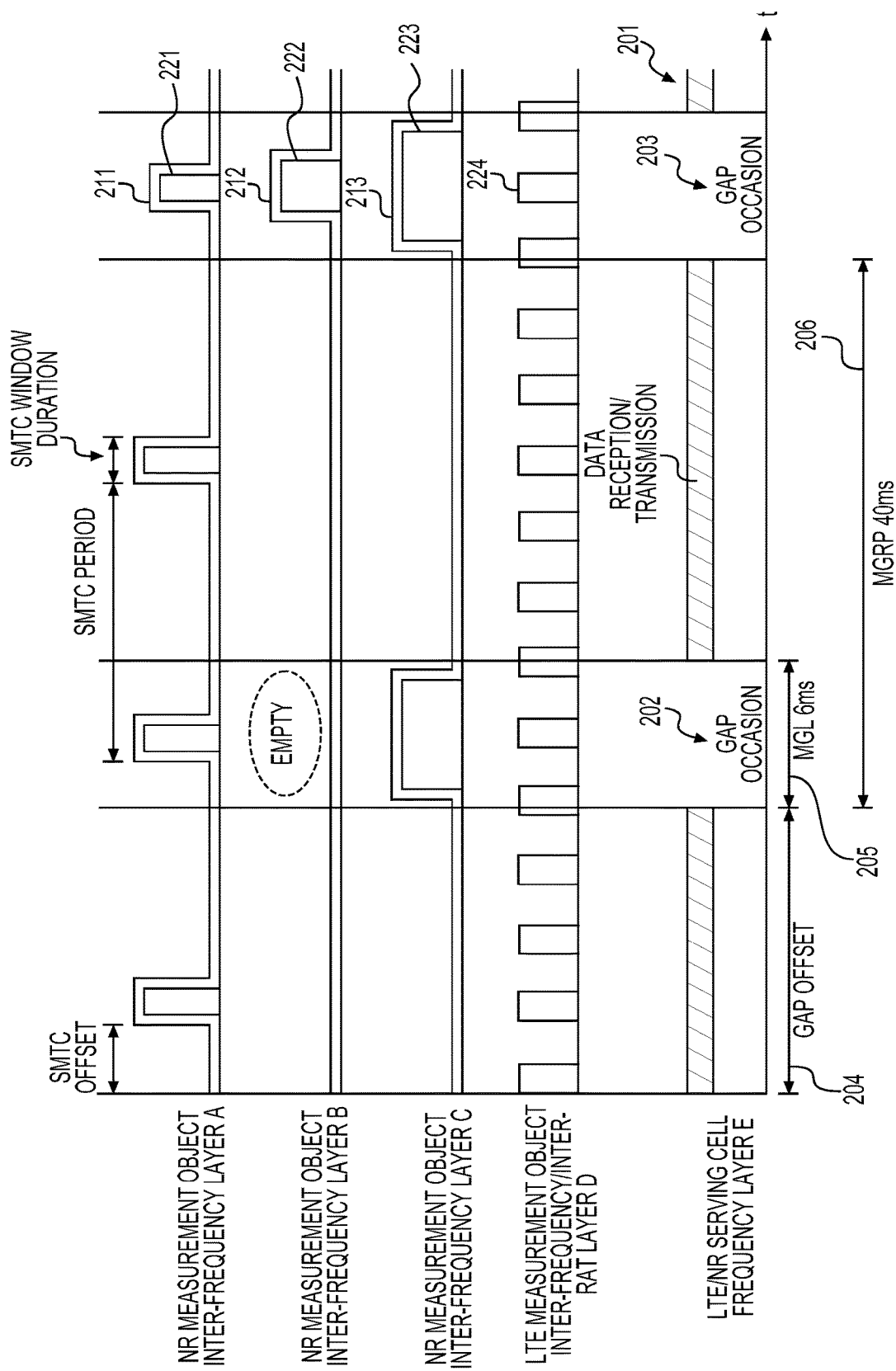
FIG. 2 shows an example of a measurement gap pattern configuration 201 and SSB measurement timing configurations (SMTCs) 211-213 according to an embodiment of the disclosure.

FIG. 2 shows an example of a measurement gap pattern configuration 201 and SMTCs 211-213 according to an embodiment of the disclosure. The measurement gap pattern configuration 201 and the SMTCs 211-213 can be configured for measuring a set of frequency layers A-D (MOs) of a set of neighboring cells of a serving cell operating on frequency layer E by the UE 110. For example, members of the frequency layers A-D can correspond to the frequency layers B1 or C1 in the FIG. 1 example.

The gap pattern configuration 201 can have a gap offset 204 with respect to a frame boundary, a MGL 205 of 6 ms, and a MGRP 206 of 40 ms. During gap occasions 202 and 203, the serving cell of the layer E may pause data reception and transmission operations. The SMTCs 211-213 are configured for the inter-frequency layers A-C(NR MOs) on which reference signals 221-223 formed by SSBs are transmitted. Each of the SMTCs 211-213 may include an offset, a period, and a window duration. For example, the periods of the SMTCs 211-213 may be 20 ms, 80 ms, and 40 ms, respectively.

The neighboring cell of the layer D can implement the E-UTRAN air interface of the 3GPP LTE standards, and transmit a sequence of reference signals each formed by a combination of a primary synchronization signal (PSS) and a secondary synchronization signal (SSS). For example, the PSS/SSS reference signal combination can be transmitted with a period of 5 ms.

In an embodiment, the UE 110 can determine a measurement delay for each frequency layer A-D. The measurement delay can be represented as an original measurement delay extended by a scaling factor. For the NR MO (the frequency layer A-C), assuming only one neighboring cell is being measured with the gap pattern 201 (i.e., the gap pattern 201 is dedicated to one neighboring cell), an original measurement delay of the measurement can take the form of:

$$M^*\max(SMTC_{period}, MGRP), \quad (1)$$

where M represents a predetermined number of samples for the measurement, $SMTC_{period}$ represents the SMTC period of the cell under monitoring, and MGRP is the repetition period of the gap pattern configured for the measurement. Based on the expression (1), the original measurement delays of the frequency layer A-C(NR MOs) can be 40M ms, 80M ms, and 40M ms. In some examples, an SMTC of the frequency layer A-C can be received from the serving cell on the frequency layer E that indicate a period, a duration and an offset of a sequence of SMTC windows (or occasions). Alternatively, in an example, when no SMTC configuration of an MO is received, a default SMTC can be used for the measurement of the MO.

For the LTE MO (the frequency layer D), the PSS/SSS reference signals are transmitted with a 5 ms period. Although no SMTC is configured for measuring the LTE MO in the FIG. 2 example, a configuration may be received from the serving cell of the frequency layer E indicating the cell on the frequency layer D is an LTE cell, and thus, a periodicity of the PSS/SSS reference signals can be determined accordingly to have a period of 5 ms and an offset of zero. Accordingly, the $SMTC_{period}$ in the expression (1) can be deleted for determining an original measurement delay for measuring an LTE neighboring cell, i.e., only use M*MGRP to calculate the original measurement delay for measuring an LTE neighboring cell.

As shown in FIG. 2, in some embodiments, the reference signals of the MOs within the SMTC occasions overlapping the gap occasions 202-203 are measured, while reference signals within the SMTC occasions but outside of the gap occasions 202-203 are not measured. In addition, reference signals outside SMTC occasions are not measured.

As shown in FIG. 2, multiple to-be-measured candidate MOs exist in each gap occasion 202 or 203. Accordingly, the sequence of gap occasions of the gap pattern 201 has to be scheduled among different MOs. As a result, the measurement delay of each frequency layers A-D will potentially be extended. The extension of the measurement delay is reflected in the scaling factor corresponding to each frequency layer under monitoring. Such a scaling factor can be referred to as a carrier-specific scaling factor.

In 3GPP LTE standards, in a scenario where N number of LTE cells is to be measured, a scaling factor corresponding to each frequency layer under monitoring can be determined to be the number N. Accordingly, in order to specify a measurement performance requirement, an extended measurement delay is determined to be an original measurement delay of measuring only one LTE cell multiplied by the number N. However, for the FIG. 2 example, due to the different SMTC periodicities, different gap occasions may observe different number of MOs that are candidates to be measured in the respective gap occasions. Accordingly, more sophisticated techniques are needed to derive a tighter measurement performance requirement on the UE 110 regarding the neighboring cell measurement.

As described herein, the present disclosure provides techniques and methods for determining the carrier-specific scaling factors. By employing the techniques and methods, a carrier-specific scaling factor can be determined for a target layer over a predetermined observation period according to numbers of to-be-measured candidate MOs or candidate frequency layers in each measurement gap where a target layer exists.

Figure 3:
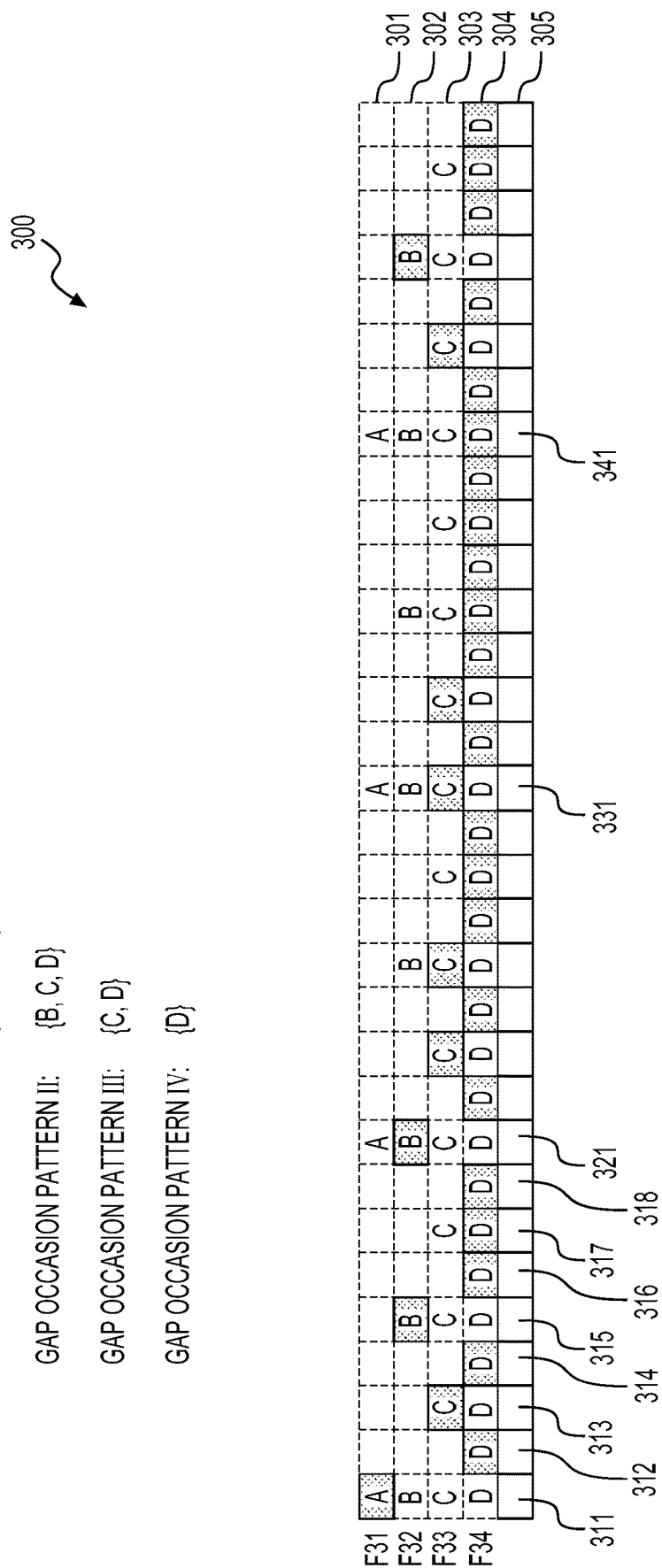
FIG. 3 shows four sequences of SSB measurement timing configuration (SMTC) windows (or occasions) 301-304 corresponding to a set of frequency layers F31-F34 according to an embodiment of the disclosure.

FIG. 3 shows four sequences of SMTC windows (or occasions) 301-304 corresponding to a set of frequency layers F31-F34 according to an embodiment of the disclosure. The SMTC occasions 301-304 are denoted by letters A, B, C, and D, respectively. The periodicities and offsets of each sequence of SMTC occasions 301-304 are (160 ms, 0), (80 ms, 0), (40 ms, 0), and (20 ms, 0). A sequence of gap occasions 305 is also configured with a MGRP of 20 ms and a zero offset. Accordingly, a combination of to-be-measured candidate MOs (or frequency layers) can be observed in each gap occasion. Each candidate MOs correspond to an SMTC window (or occasion) A, B, C, or D observed in a respective measurement gap. Thus, the letters A-D can also be used to refer to the respective candidate MOs in each gap occasion. The frequency layers F31-F34 can be intra-frequency layers to be measured with gaps, intra-frequency layers to be measured without gaps where the SMTC windows fully overlaps the sequence of gaps 305, or inter-frequency/inter-RAT layers.

In an embodiment, in order to conduct measurement on the layers F31-F34, the gap occasions 305 are scheduled in a way that the MOs in each gap occasion are equally measured (i.e., measured with equal measured probability). In addition, gap occasion patterns are introduced for determining the scheduling.

For example, the gap occasions 305 can first be grouped according to the gap occasion patterns. A gap occasion pattern can refer to a combination of candidate frequency layers present in the respective gap occasion. In the FIG. 3 example, the following four different combinations of candidate frequency layers present in a gap occasion can be recognized: {A, B, C, D}, {B, C, D}, {C, D}, and {D}, which are numbered with I, II, III, and IV. Accordingly, the gap occasions of the same gap occasion pattern can be arranged into a same group. For example, the gap occasions 311, 321, 331, and 341 can form a first group corresponding to the gap occasion pattern I.

Then, for each group of gap occasions, the candidate MOs (frequency layers F31, F32, F33, or F34) within the respective gap occasion pattern are measured with equal opportunity (or probability). For example, in the FIG. 3 example, the gap occasions in a same gap occasion group are scheduled in a round-robin manner, resulting of a measurement sequence of A, D, C, D, B, D, D, and D over the gap occasions 311-318. In alternative examples, the gap occasions of each group may be scheduled in a sequential way. For example, in the gap occasion group of the gap occasion pattern II, the layer F33 (candidate MO C) may first be measured until a predetermined number of samples on the layer F32 (candidate MO B) is obtained.

In either of the above resultant measurement sequences, the MOs within a gap occasion pattern are measured equally over the respective group of gap occasions. For example, in the group of gap occasion pattern {A, B, C, D}, each layer F31-F34 has a measured probability of 25% in each gap occasion. In the group of gap occasion pattern {B, C, D}, each layer F31-F34 has a measured probability of one third in each gap occasion.

In addition, in one example, the scheduling of the gap occasions 305 can further include an early termination scheme. For example, when a sufficient number of samples of a frequency layer has been reached, the measurement of the frequency layer can be terminated.

Based on the above equal-opportunity scheduling method, in an embodiment, carrier-specific scaling factors of each frequency layer F31-F34 can be determined in the following way. First, a measured probability of a frequency layer within a gap occasion can be determined by averaging a sum of measured probabilities of the frequency layer within each gap occasion pattern. For example, the frequency layer F32 is included in the gap occasion patter I {A, B, C, D}, and the gap occasion pattern II {B, C, D}. The measure probabilities of F32 corresponding to the gap occasion pattern I and II are 1/4 and 1/3, respectively. Thus, the averaged measured probability can be determined to be (1/2)*(1/4+1/3)=7/24.

Second, an inverse of the averaged measured probability is used as the carrier-specific scaling factor of the respective frequency layer. Additionally, a ceiling operation can be performed over the inverse of the averaged measurement probability to obtain an integer value of the scaling factor. For example, based on the averaged measured probability 7/24, the ceiled scaling factor can be ceil(24/7)=4.

Figure 4:
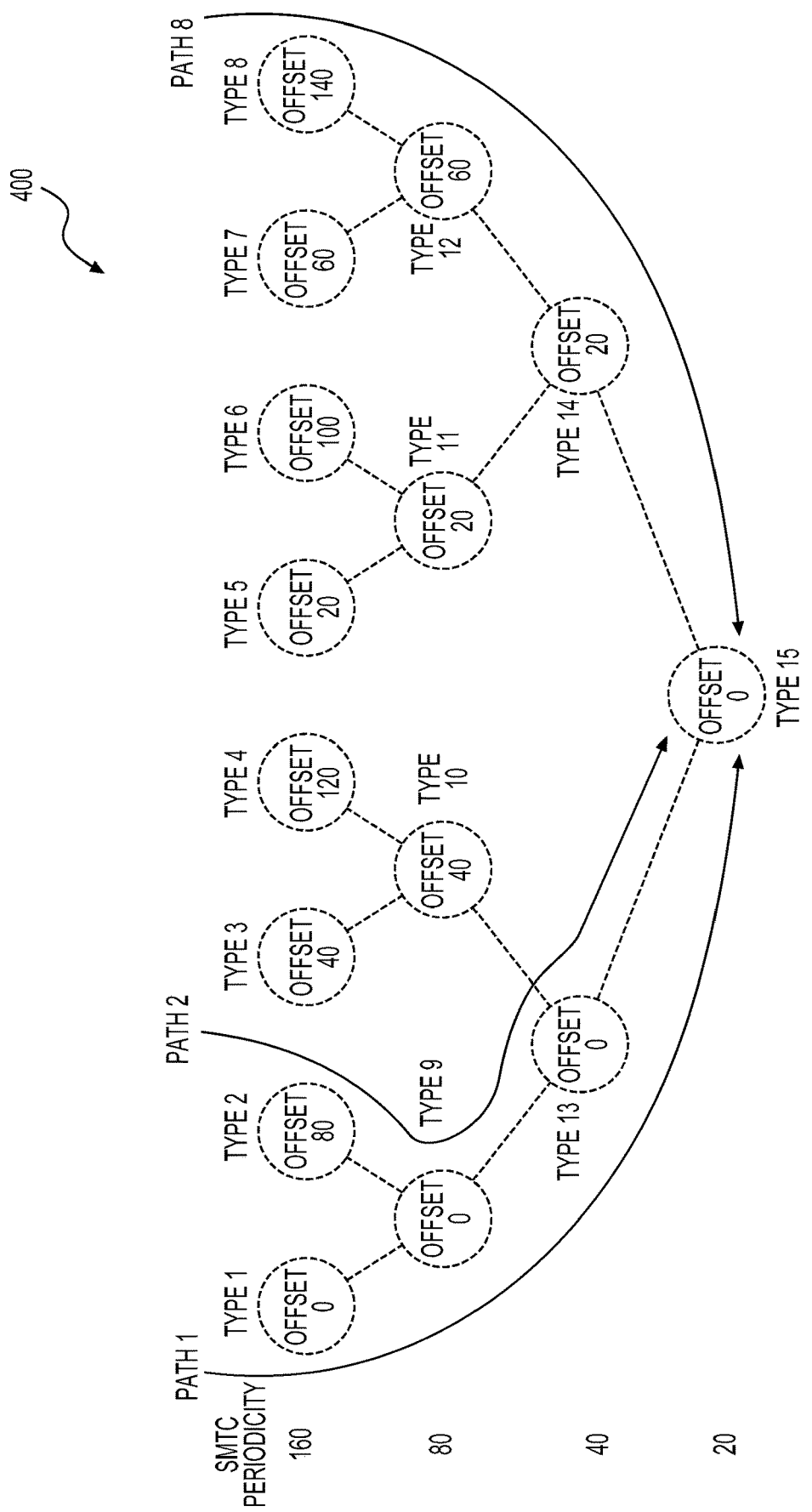
FIG. 4 shows a graph 400 according to an embodiment of the disclosure.

FIG. 4 shows a graph 400 according to an embodiment of the disclosure. The graph 400 can be used to determine a carrier-specific scaling factor of a particular layer when multiple layers are being monitored using gaps. The graph 400 has a tree structure including 15 nodes corresponding to 15 possible SMTCs each having a combination of periodicity and offset. For example, in an embodiment, an SMTC periodicity can have a value among {20 ms, 40 ms, 80 ms, 160 ms}. An SMTC offset can have a value among {0 ms, 20 ms, 40 ms, 60 ms, 80 ms, 100, ms, 120 ms, 140 ms}. For a particular SMTC, the offset value can be smaller than the respective periodicity value. Accordingly, there can be 15 possible SMTCs corresponding to the 15 combinations of periodicity and offset. Each such SMTC is categorized as a type, and denoted as Type(periodicity, offset).

The 15 types are organized into the tree structure according to possible combinations of SMTCs existing in a gap occasion pattern. Specifically, the 15 types are organized into 4 layers corresponding to the 4 possible SMTC periodicities 20 ms, 40 ms, 80 ms, and 160 ms from the bottom to the top of the graph 400. Then, types that are possible to exist in a same gap occasion pattern are connected with each other. As a result, eight possible paths from path 1 to path 8 are formed from the eight top-layer nodes to the bottom-layer node. Each path corresponds to a combination of 4 types that can exist in a same gap occasion pattern. The eight paths represent a total of eight possible gap occasion patterns corresponding to the combinations of 4 types.

When analyzing a gap-based measurement process with multiple MOs, a number of frequency layers or MOs having SMTCs belonging to a type of a combination of (periodicity, offset) is denoted as N(periodicity, offset). Depending on the MOs' SMTC configurations, the number N(periodicity, offset) of a type can be zero or more than zero.

As described above, the MOs of a gap occasion pattern can be measured with equal measured probability when scheduling the gaps corresponding to different gap occasion patterns. Based on this gap scheduling scheme, a carrier-specific scaling factor for a target layer under monitoring can be determined using the graph 400 in the following way.

First, a type which the target layer's SMTC belongs to can be determined. Second, all paths (that are ones of the eight paths described above) traversing the node of the determined type can be identified. Third, for each path, a measured probability of the determined type can be determined. For example, the measured probability of the determined type in a path can be a ratio of the number of layers belonging to the determined type to the total number of layers belonging to the path. Fourth, the sum of the determined measured probabilities of each path traversing the determined type can be averaged, and subsequently divided by the number of MOs the SMTCs of which belongs to the determined type, resulting in an averaged measure probability. Fifth, an inverse of the averaged measured probability can be determined to be the scaling factor of the target layer. Ceiling operation may be applied to the inversed value to obtain a scaling factor with an integer value.

In an embodiment, a carrier-specific scaling factor for a target layer under monitoring can be determined based on the graph 400 according to the following expression:

$$\text{the scaling factor} = N_{(periodicity, offset)} \times \left( \frac{1}{\frac{1}{N_{path}} \sum_{i=1}^{N_{path}} R_{i,(periodicity, offset)}} \right) \quad (2)$$

$$= \frac{1}{\frac{1}{N_{path}} \sum_{i=1}^{N_{path}} \left( \frac{R_{i,(periodicity, offset)}}{N_{(periodicity, offset)}} \right)},$$

where $N_{(periodicity, offset)}$ represents a number of MOs belonging to the same type of the target layer, $N_{path}$ represents a number of paths traversing the type of the target layer, $R_{i,(periodicity, offset)}$ represents a measured probability of the type of the target layer among all types belonging to the path with an index of i. In one example, a ceiling operation may be applied to the scaling factor calculated with the expression (2).

In an embodiment, a carrier-specific scaling factor for a target layer under monitoring take a ceiling of equation (2), i.e., $$\text{ceil}\left(\frac{1}{\frac{1}{N_{path}}\sum_{i=1}^{N_{path}}\left(\frac{R_{i,(periodicity,offset)}}{N_{(periodicity,offset)}}\right)}\right).$$

In an embodiment, a carrier-specific scaling factor for a target layer under monitoring use an inverse of minimal measured probability $$\frac{1}{\min_i\left(\frac{R_{i,(perioidicity,offset)}}{N_{(periodicity,offset)}}\right)}$$

(i.e. the maximal number of candidate MOs $$\max_i\left(\frac{N_{(periodicity,offset)}}{R_{i,(periodicity,offset)}}\right)),$$

instead of an inverse of averaged measured proabability $$\frac{1}{\frac{1}{N_{path}}\sum_{i=1}^{N_{path}}\left(\frac{R_{i,(periodicity,offset)}}{N_{(periodicity,offset)}}\right)}$$

or a ceiling of inverse of averaged measured proabability $$\text{ceil}\left(\frac{1}{\frac{1}{N_{path}}\sum_{i=1}^{N_{path}}\left(\frac{R_{i,(periodicity,offset)}}{N_{(periodicity,offset)}}\right)}\right),$$

to calculate the carrier-specific scaling factor.

In an embodiment, by multiplying the scaling factor of the expression (2) with an original measurement delay, an extended measurement delay is represented as:

the extended measurment delay = (3)

$$M \times \left\{[\max(SMTC_{periodicity}, MGRP) \times N_{(periodicity,offset)}] \times \right.$$

$$\left.\left(\frac{1}{\frac{1}{N_{path}}\sum_{i=1}^{N_{path}} R_{i,(periodicity,offset)}}\right)\right\} =$$

$$M \times \left\{[\max(SMTC_{periodicity}, MGRP)] \times \right.$$

$$\left.\frac{1}{\frac{1}{N_{path}}\sum_{i=1}^{N_{path}}\left(\frac{R_{i,(periodicity,offset)}}{N_{(periodicity,offset)}}\right)}\right\}.$$

Figure 5:
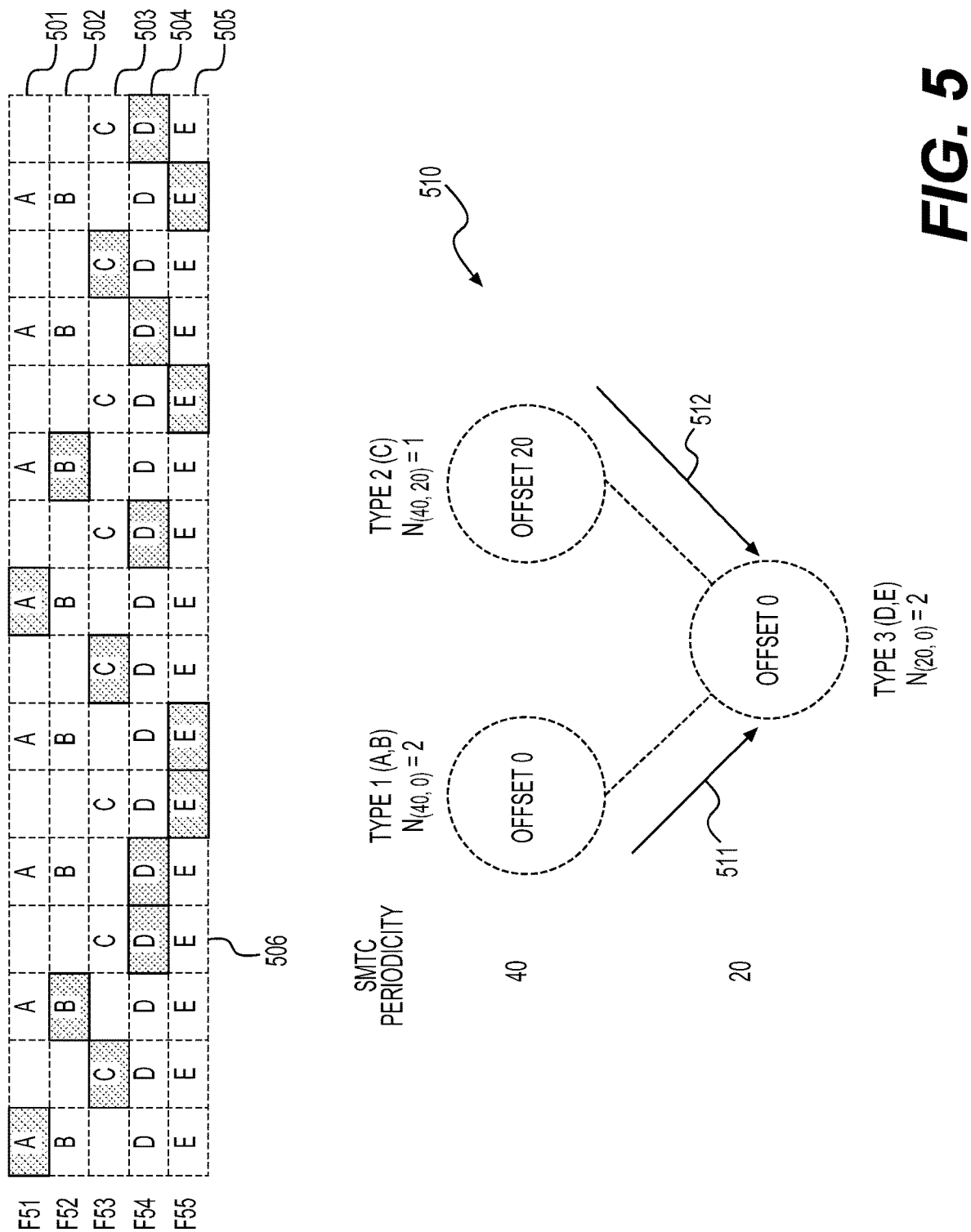
FIG. 5 shows an example of deriving carrier-specific scaling factors for measuring a set of frequency layers F51-F55 with gaps according to an embodiment of the disclosure.

FIG. 5 shows an example of deriving carrier-specific scaling factors for measuring a set of frequency layers F51-F55 with gaps according to an embodiment of the disclosure. Five sequences of SMTC occasions 501-505 are shown in FIG. 5 corresponding to the five frequency layers F51-F55 and denoted A, B, C, D, and E, respectively. Each column 506 of SMTC occasions corresponding to a gap occasion belonging to a gap pattern with a periodicity of 20 ms.

The layers F51 and F52 have a same SMTC configuration with a periodicity of 40 ms and an offset of 0 ms, and can be categorized into a first type (40, 0). The layer F53 has an SMTC configuration with a periodicity of 40 ms and an offset of 20 ms, and can be categorized into a second type (40, 20). The layers F54 and F55 have a same SMTC configuration with a periodicity of 20 ms and an offset of 0 ms, and can be categorized into a third type (20, 0). The three types form a graph 510. Based on the graph 510, two paths 511 and 512 can be recognized corresponding to two gap occasion patterns {A, B, D, E} and {C, D, E}. As can be seen in FIG. 5, the gap occasions of a same gap occasion pattern are equally scheduled for measuring the set of frequency layers in the same gap occasion pattern, resulting a measurement sequence started with A, C, B, D, D, E, E, and C.

For the layer F51 that is measured in the gap occasion pattern {A, B, D, E} but not in the gap occasion pattern {C, D, E}, a measured probability of the layer F51 in the gap pattern is $$\frac{R_{i,(periodicity,offset)}}{N_{(periodicity,offset)}} = 1/4.$$

Accordingly, a scaling factor of the layer F51 that is an inverse of the measured probability is determined to be 4.

For the layer F52 that has a same SMTC as the layer F1, the same scaling factor of the layer F52 as that of F1 can be determined for the layer F52.

For the layer F53 that is measured in the gap accession pattern {C, D, E}, but not in the gap occasion pattern {A, B, D, E}, a measured probability of the layer F3 in the gap pattern is $$\frac{R_{i,(periodicity,offset)}}{N_{(periodicity,offset)}} = 1/3.$$

Accordingly, a scaling factor of the layer F53 that is an inverse of the measured probability is determined to be 3.

For the layer F54 that is measured in both the gap accession patterns {A, B, D, E} and {C, D, E}. A first measured probability of the layer F54 corresponding to the pattern {A, B, D, E} is $$\frac{R_{i,(periodicity,offset)}}{N_{(periodicity,offset)}} = 1/4.$$

A second averaged measured probability of the layer F54 corresponding to the pattern {B, D, E} is $$\frac{R_{i,(periodicity,offset)}}{N_{(periodicity,offset)}} = 1/3.$$

An average of the first and second measured probabilities is 7/24. Accordingly, a scaling factor of the layer F54 that is an inverse of the average value 7/24 is determined to be 24/7.

Figure 6:
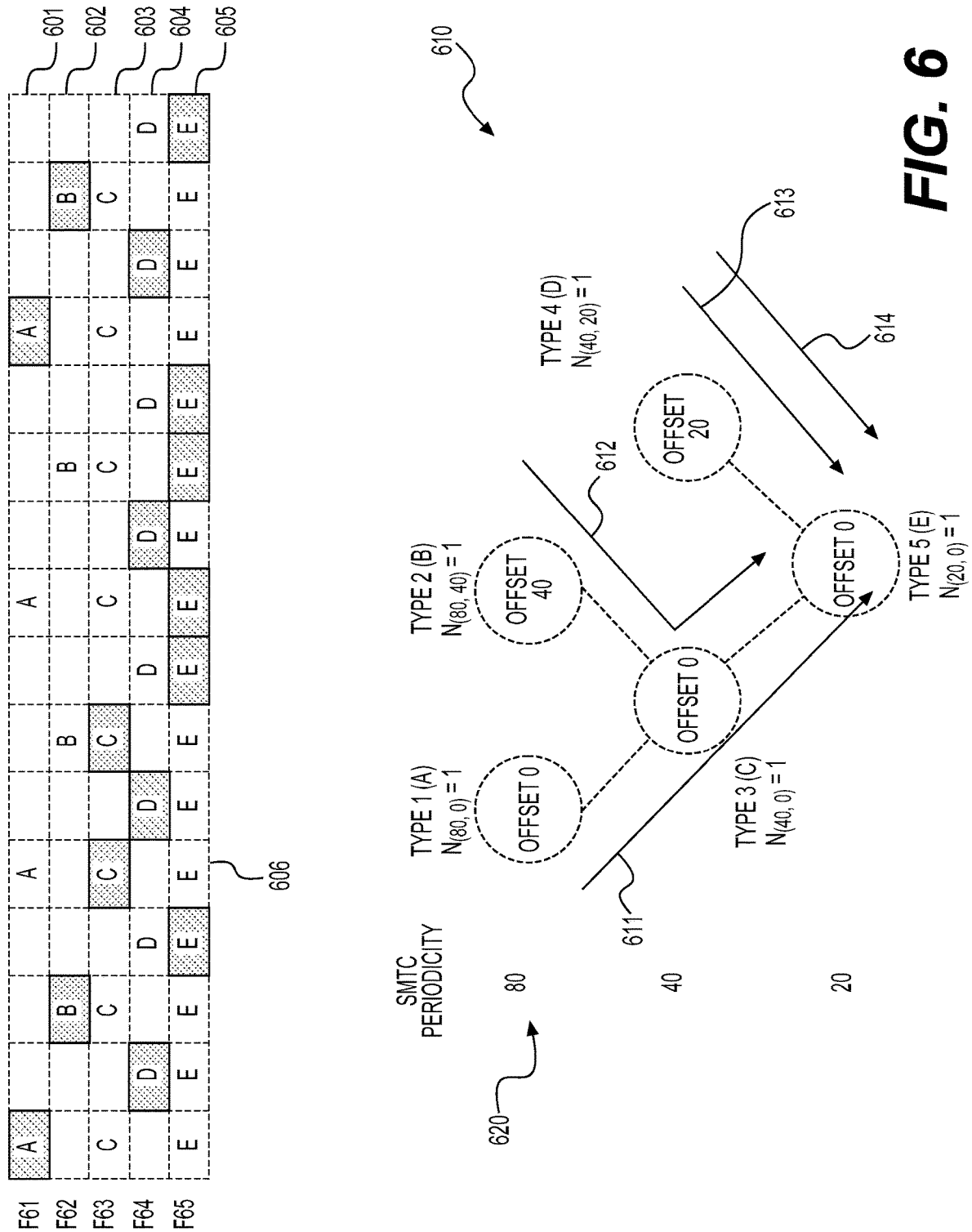
FIG. 6 shows another example of deriving carrier-specific scaling factors for measuring a set of frequency layers F61-F65 with gaps according to an embodiment of the disclosure.

FIG. 6 shows another example of deriving carrier-specific scaling factors for measuring a set of frequency layers F61-F65 with gaps according to an embodiment of the disclosure. Five sequences of SMTC occasions 601-605 are shown in FIG. 6 corresponding to the five frequency layers F61-F65 and denoted A, B, C, D, and E, accordingly. Similar to the FIG. 5 example, each column 606 of SMTC occasions corresponding to a measurement gap belonging to a gap pattern with a periodicity of 20 ms.

The layers F61-F65 are categorized into 5 types (80, 0), (80, 40), (40, 0), (40, 20), and (20, 0) according to the respective SMTC configurations and form a graph 610 shown in FIG. 6. In an embodiment, a number of paths in the graph 610 is determined according to the highest level 620 (corresponding to the SMTC periodicity of 80 ms) in the graph 610 that includes non-zero number of types. For example, the number of possible nodes in the highest level 620 (including nodes having N(periodicity, offset) equal to zero) can be determined to be the number of paths in the graph 610. Accordingly, four paths 611-614 can be identified corresponding to 4 gap occasion patterns {A, C, E}, {B, C, E}, {D, E}, and {D, E}.

Similar to the FIG. 5 example, the gap occasions of a same gap occasion pattern are equally scheduled for measuring the set of frequency layers in the same gap occasion pattern, resulting a measurement sequence started with A, D, B, E, C, D, C, and E.

The layer F61 exists in the gap occasion pattern {A, C, E}, while the layer F62 exists in the gap occasion pattern {B, C, E}. Accordingly, the layers F61 and F62 each have a measured probability of 1/3 in one gap pattern. A scaling factor of the layer F61 or F62 can be 3.

The layer F63 is included in two gap occasion patterns {A, C, E} and {B, C, E}, and has measured probabilities of 1/3 and 1/3 corresponding to the two gap occasion patterns {A, C, E} and {B, C, E}. A scaling factor of the layer F63 can be an inverse of an average of the two measured probabilities 1/3 and 1/3, and has a value of 3.

The layer F64 is included in two gap occasion patterns, and has measured probabilities of 1/2 and 1/2 corresponding to the two gap occasion patterns {D, E}, and {D, E}. A scaling factor of the layer F4 can be an inverse of an average of the two measured probabilities 1/2 and 1/2, and has a value of 2.

The layer F65 exists in 4 gap occasion patterns, and has measured probabilities of 1/3, 1/3, 1/2, and 1/2 corresponding to the four gap occasion patterns {A, C, E}, {B, C, E}, {D, E}, and {D, E}. A scaling factor of the layer F5 can be an inverse of an average of the 4 measured probabilities 1/3, 1/3, 1/2, and 1/2, and has a value of 12/5.

In some embodiments, gap sharing schemes are employed for measuring multiple MOs including intra-frequency and inter-frequency/inter-RAT MOs. For example, the measurement configurations 141 may include a gap sharing configuration. The gap sharing configuration may indicate a gap sharing scheme is to be used for measuring the serving cell 130 and neighboring cells 131-134. For example, the serving cell 130 and neighboring cells 131-134 can be categorized into an inter-frequency/inter-RAT group and an intra-frequency group. Each group is assigned a percentage of measurement opportunities of the gap occasions configured for the measurement by using a gap sharing value, X. For example, X % of measurement opportunities is assigned for the intra-frequency measurement, while (1−X) % of measurement opportunities is assigned for the inter-frequency/inter-RAT measurement. By adjusting the gap sharing value, X, a priority can be given to one of the two inter- and intra-frequency groups.

Alternatively, the measurement configuration 141 may indicate equal splitting is applied to the MOs in the two groups, and thus no gap sharing is employed. Under such equal splitting configuration, the to-be-measured cells are measured equally. For example, if there two intra-frequency MOs and one inter-frequency MO are configured for monitoring in one gap with equal splitting, each MO has a measured probability of 1/3 in the gap. In some examples, when the gap sharing configuration is not provided from the serving cell 130, the equal splitting is used by default.

When a gap sharing scheme is configured for sharing gaps between the intra-frequency MOs and inter-frequency/inter RAT MOs, in some embodiments, the scheduling of gap occasions for measuring the MOs is performed in the following way. First, the gap sharing is applied to gap occasions where to-be-measured candidate MOs include at least one intra-frequency MO and at least one inter-frequency/inter-RAT MO. The at least one intra-frequency MO can be an intra-frequency MO to be measured with gaps or an intra-frequency MO of which SMTC occasions fully overlap the gaps configured for the measurement. For gap occasions observing only one type of candidate MOs, either intra-frequency MOs or inter-frequency/inter-RAT MOs, the gap sharing is not applied.

Second, within a gap where both intra-frequency and inter-frequency/inter-RAT MOs exist, measurement opportunities are partitioned between the two groups or types of MOs according to the configured gap sharing values. For example, the group of intra-frequency MOs shares the X % of the measurement probabilities of the gap, while the group of inter-frequency/inter-RAT MOs shares the (1−X) % of measurement probabilities of the gap.

Third, within a group of MOs in the gap where both intra-frequency and inter-frequency/inter-RAT MOs exist, either the group of intra-frequency MOs or the group of inter-frequency/inter-RAT MOs, the MOs equally shares the measurement opportunities assigned to this group.

In some embodiments, when no gap sharing scheme is used (e.g., configured with equal splitting or no gap sharing configuration is received), carrier-specific scaling factors can be determined using the techniques and methods described above with reference to the FIGS. 3-6 examples.

In contrast, in some embodiments, when a gap sharing scheme is applied, and a gap occasion scheduling with consideration of the applied gap sharing scheme is used, carrier-specific scaling factors per MOs can be derived in the following way. For example, gap occasion patterns applied gap sharing scheme can first be identified among configured gap occasions. Then, the MOs in gap occasion pattern applied gap sharing scheme can be separated into an intra-frequency group including the intra-frequency MOs and an inter-frequency/inter RAT group including the inter-frequency/inter-RAT MOs. The carrier-specific scaling factors are subsequently determined separately for the two groups.

For a target MO in the intra-frequency group, measured probabilities in each gap occasion pattern that includes the target MO are calculated and averaged to obtain an averaged measured probability. For the gap occasion patterns including both intra-frequency and inter-frequency/inter-RAT MOs, the respective measured probabilities are calculated with consideration of the gap sharing scheme. For example, X % of a gap occasion is equally shared among the intra-frequency MOs in the gap occasion pattern where the gap sharing scheme is applied. For the gap occasion patterns including only intra-frequency MOs, one gap (of measurement opportunities) is equally shared among the respective intra-frequency MOs. An inverse of the averaged measured probability can be used as the scaling factor of the target MO.

For a target MO in the inter-frequency/Inter-RAT group, the carrier-specific scaling factor can be determined in a similar way as what is described above. For example, measured probabilities in each gap occasion pattern that includes the target MO are calculated and averaged to obtain an averaged measured probability. However, for gap occasion patterns including both intra-frequency and inter-frequency/inter-RAT MOs, (1−X) % of a gap occasion is equally shared among the inter-frequency/inter-RAT MOs in the gap occasion pattern where the gap sharing scheme is applied.

In an embodiment, when a gap sharing scheme is applied, a graph can be constructed in a way similar to the FIG. 4 example, and gap occasion patterns can be identified in a similar way. However, when determining carrier-specific scaling factors, intra-frequency MOs and inter-frequency/inter-RAT MOs are considered separately.

For example, when a gap sharing scheme is applied, a carrier-specific scaling factor for a target intra-frequency layer (or MO) under monitoring can be determined based on the graph according to the following expression:

the scaling factor of the intra-frequency $MO =$  (4)

$$N_{intra,(periodicity,offset)} \times \left( \frac{1}{\frac{1}{N_{path}} \sum_{i=1}^{N_{path}} R'_{intra,i,(periodicity,offset)}} \right), = \frac{1}{\frac{1}{N_{path}} \sum_{i=1}^{N_{path}} \frac{R'_{intra,i,(periodicity,offset)}}{N_{intra,(periodicity,offset)}}},$$

where $N_{intra,(periodicity,offset)}$ represents a number of intra-frequency MOs belonging to the same type of the target layer, $N_{path}$ represents a number of paths traversing the type of the target layer, $R'_{intra,i,(periodicity,offset)}$ represents a measured probability of the type of the target layer among all types belonging to the path with an index of i with considerations that only intra-frequency MOs are considered for the calculation and that the gap sharing effect is considered.

For example, the measured probability $R'_{intra,i,(periodicity,offset)}$ can be determined in the following way:

(i) when the path i does not traverse a type corresponding to an inter-frequency/inter-RAT MO, $$R'_{intra,i,(periodicity,offset)} = R_{intra,i,(periodicity,offset)}, \quad (5)$$

where $R_{intra,i,(periodicity,offset)}$ represents a measured probability of the type of the target layer among all types belonging to the path with the index of i.

(ii) When the path i traverses a type corresponding to an inter-frequency/inter-RAT MO, $$R'_{intra,i,(periodicity,offset)} = \frac{1}{K_{intra}} \times R_{intra,i,(periodicity,offset)}, \quad (6)$$

where $K_{intra}$ represents an intra-frequency gap sharing factor that is an inverse of the gap sharing percentage X %, and $R_{intra,i,(periodicity,offset)}$ represents a measured probability of the type of the target layer among all types belonging to the path with an index of i, but without considering inter-frequency/inter-RAT MOs of the types in the path i.

In an embodiment, a carrier-specific scaling factor for a target layer under monitoring take ceiling of equation (4), such as according to the scaling factor of the intra-frequency $$MO = \text{ceil}\left( \frac{1}{\frac{1}{N_{path}} \sum_{i=1}^{N_{path}} \frac{R'_{intra,i,(periodicity,offset)}}{N_{intra,(periodicity,offset)}}} \right). \quad (7)$$

In an embodiment, a carrier-specific scaling factor for a target layer under monitoring use an inverse of minimal measured proabability (i.e. the maximal number of candidate MOs)

$$\frac{1}{\min_i \left( \frac{R'_{intra,i,(periodicity,offset)}}{N_{intra,(periodicity,offset)}} \right)} = \max_i \left( \frac{N_{intra,(periodicity,offset)}}{R'_{intra,i,(periodicity,offset)}} \right), \quad (8)$$

instead of an inverse of averaged measured proabability $$\frac{1}{\frac{1}{N_{path}} \sum_{i=1}^{N_{path}} \frac{R'_{intra,i,(periodicity,offset)}}{N_{intra,(periodicity,offset)}}}$$

or a ceiling of inverse of averaged measured proabability $$\text{ceil}\left( \frac{1}{\frac{1}{N_{path}} \sum_{i=1}^{N_{path}} \frac{R'_{intra,i,(periodicity,offset)}}{N_{intra,(periodicity,offset)}}} \right),$$

to calculate the carrier-specific scaling factor

In a similar way, expressions similar to expressions (4)-(8) can be used to determine scaling factors of inter-frequency/inter-RAT MOs with the inter-frequency/inter-RAT MOs being considered in place of the intra-frequency MOs. In addition, an inter-frequency gap sharing factor $K_{inter}$ is used in place of $K_{intra}$ where $$K_{inter} = \frac{1}{(1-X)\%}$$

in one example. In alternative examples, the gap sharing factors $K_{inter}$ or $K_{intra}$ may be defined in a way different from the above described examples, for example, may be defined independent from the gap sharing value X.

Figure 7:
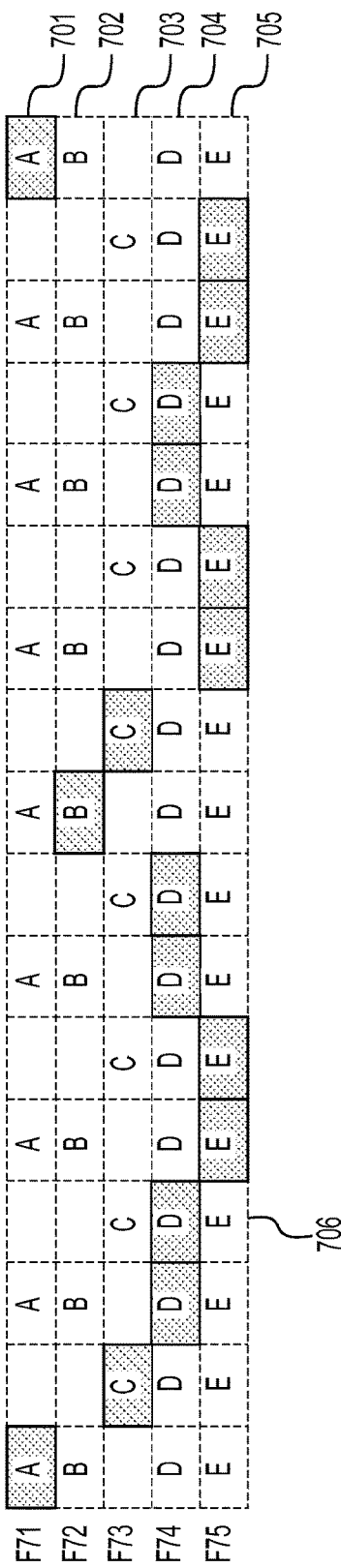
FIG. 7 shows an example of deriving carrier-specific scaling factors for measuring a set of frequency layers F71-F75 based on a gap sharing scheme according to an embodiment of the disclosure.
Figure 7:
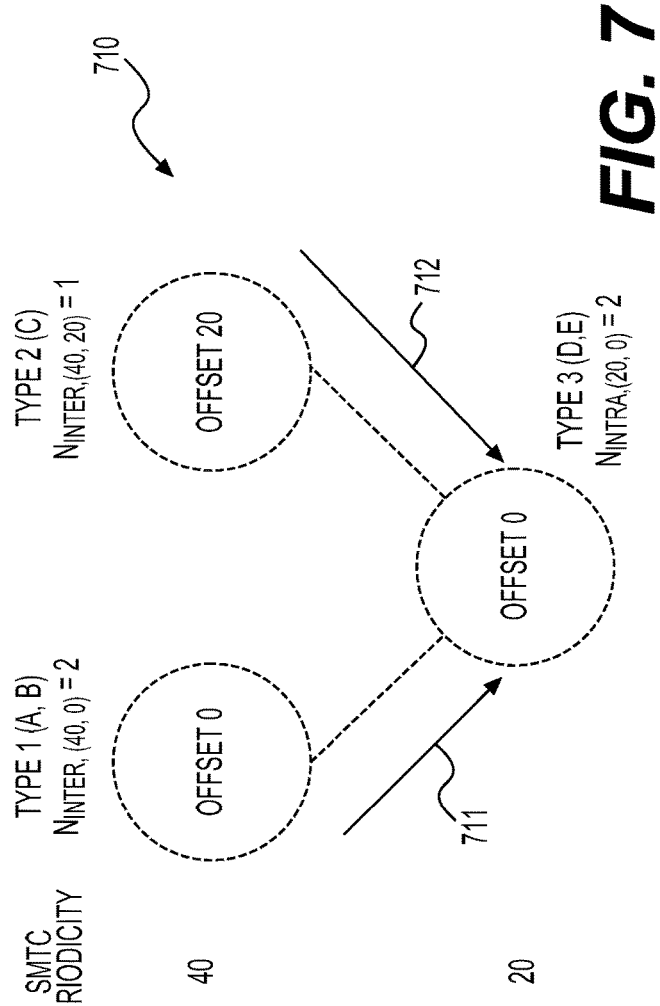

FIG. 7 shows an example of deriving carrier-specific scaling factors for measuring a set of frequency layers F71-F75 based on a gap sharing scheme according to an embodiment of the disclosure. Five sequences of SMTC occasions 701-705 are shown in FIG. 7 corresponding to the five frequency layers F71-F75 and denoted A, B, C, D, and E, respectively. Each column 706 of SMTC occasions corresponding to a measurement gap belonging to a gap pattern with a periodicity of 20 ms. The frequency layers F71-F73 are inter-frequency/inter-RAT layers, and are configured with a gap sharing percentage of 25%, from which a gap sharing factor $K_{inter}$=4 can be derived. In contrast, the frequency layers F74-F75 are intra-frequency layers, and configured with a gap sharing percentage of 75%, from which a gap sharing factor $K_{intra}$=4/3 can be derived.

The layers F71 and F72 have a same SMTC configuration with a periodicity of 40 ms and an offset of 0 ms, and can be categorized into a first type (40, 0). The layer F73 has an SMTC configuration with a periodicity of 40 ms and an offset of 20 ms, and can be categorized into a second type (40, 20). The layers F74 and F75 have a same SMTC configuration with a periodicity of 20 ms and an offset of 0 ms, and can be categorized into a third type (20, 0). The three types form a graph 710. Based on the graph 710, two paths 711 and 712 can be recognized corresponding to two gap occasion patterns {A, B, D, E} and {C, D, E}.

Based on the gap sharing parameters $K_{inter}$ and $K_{intra}$, the gap occasions can be scheduled in the following way. As to-be-measured candidate MOs in each gap occasion include both the intra-frequency and inter-frequency/inter-RAT MOs, the gap sharing scheme would be applied in every gap occasion.

For the first gap pattern {A, B, D, E}, 100% measurement opportunities in a gap occasion are shared between the group of the inter-frequency/inter-RAT layers F71 and F72 and the group of the intra-frequency layers F74 and F75 according to the gap sharing percentages 25% and 75%. Within the group {F71, F72}, the 25% measurement opportunities are equally shared between the layers F71 and F72. Similarly, within the group {F74, F75}, the 75% measurement opportunities are equally shared between the layers F74 and F75. As a result, for the first gap pattern {A, B, D, E}, the frequency layers F71, F72, F74 and F75 each are assigned a measured probability of 1/8, 1/8, 3/8, and 3/8, respectively.

For the second gap pattern {C, D, E}, similarly, two groups {F73} and {F74, F75} can each have a measured probability of 25% and 75%. By equally sharing the measurement opportunities within a same group, the frequency layer F73 can have a measured probability of 1/4, while the frequency layers F74 and F75 can each have a measured probability of 3/8.

In an embodiment, based on the above scheduling method, the measurement scaling factors for each frequency layer F71-F75 can be determined in the following way. First, the two gap occasion pattern (or paths 711-712) can first be identified based on the graph 710. Then, the frequency layers F71-F75 (MOs) can be grouped into a first group of inter-frequency/inter-RAT MOs {F71, F72, F73} and a second group of intra-frequency MOs {F74, F75}. The scaling factors of the two groups are determined separately.

For a target inter-frequency MO in the first group, the gap occasion patterns including the target MO can be identified. Then, measured probabilities of the target inter-frequency MO in each gap occasion pattern including the target inter-frequency MO can be determined. For the gap occasion pattern where the gap sharing scheme is applied, the respective gap sharing factor $K_{inter}$ is used for determining the measured probability. An average of the determined measured probabilities can be used as the scaling factor of the target MO.

For example, the inter-frequency layer F71 of the first group belongs to one gap pattern {A, B, D, E}. Considering the gap sharing percentage 25%, the frequency layer F71 and the frequency layer F72 equally share the 25% of the measurement opportunities in one gap occasion, and thus has a measured probability of 1/8. Accordingly, the scaling factor of the frequency layer F71 is 8 that is an inverse of the measure probability 1/8. For example, the inter-frequency layer F73 belongs to one gap pattern {C, D, E}, and does not share the gap sharing percentage 25% with any other inter-frequency layers. Thus, has a measured probability of 1/4, and a scaling factor of 4.

For a target intra-frequency MO in the second group, the scaling factor can be determined in a way similar to the target inter-frequency MO. For example, the gap occasion patterns including the target intra-frequency MO can be identified. Then, measured probabilities of the target MO in each gap occasion pattern including the target intra-frequency MO can be determined. Similarly, for the gap occasion pattern where the gap sharing scheme is applied, the respective gap sharing factor $K_{intra}$ is used for determining the measured probability. An average of the determined measured probabilities can be used as the scaling factor of the target intra-frequency MO.

For example, the inra-frequency layer F74 belongs to the two gap occasion patterns {A, B, D, E} and {C, D, E}. In both gap occasion patterns, the layer F74 shares the gap sharing percentage of 75% with the layer F75 equally. Accordingly, measured probabilities corresponding to the two gap occasion patterns can be 3/8 and 3/8. An inverse of an average of the measured probabilities of the target MO over the two gap occasion patterns is 8/3 which can be used as the scaling factor of the layer F74.

Figure 8:
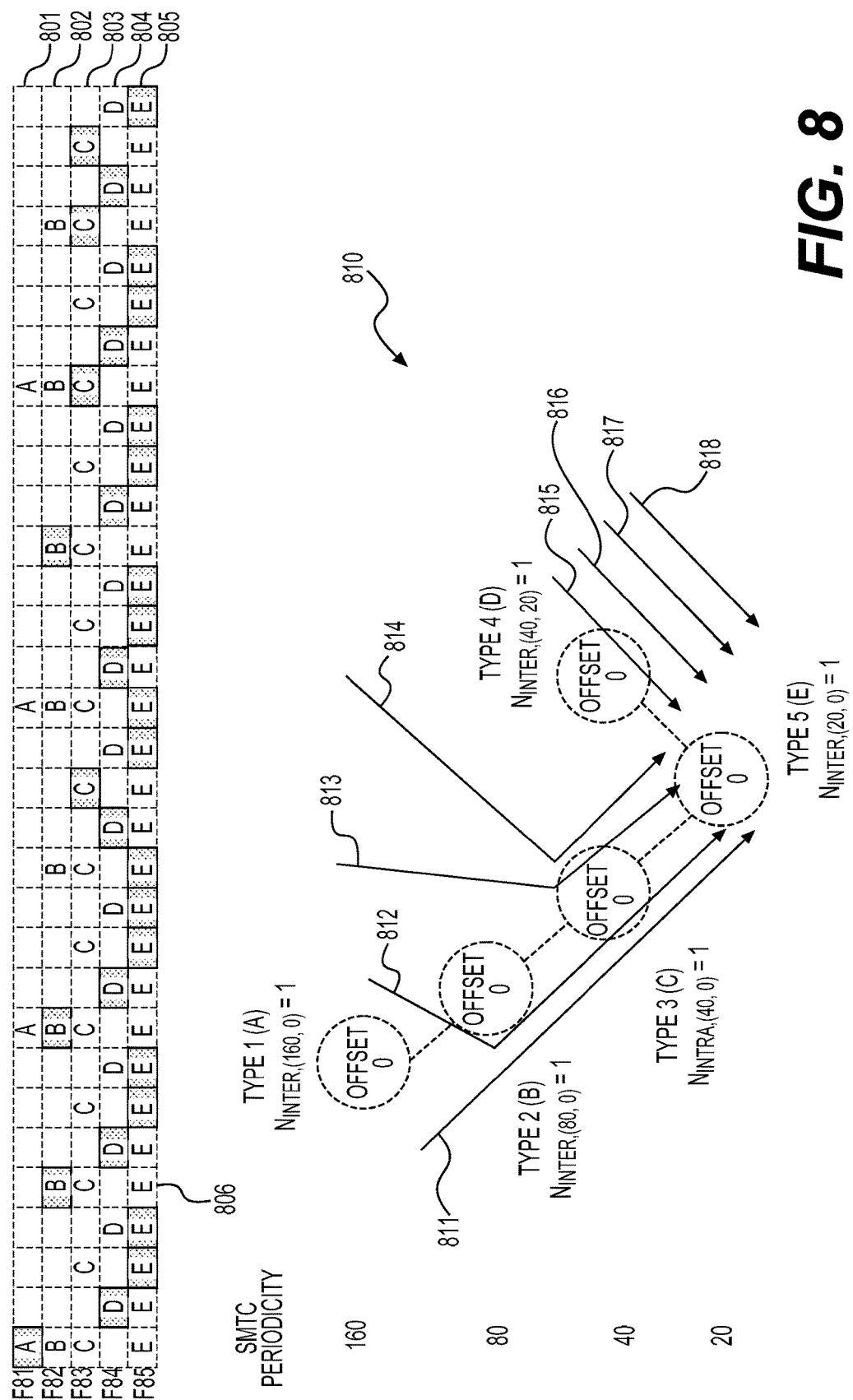
FIG. 8 shows another example of deriving carrier-specific scaling factors for measuring a set of frequency layers F81-F85 with a gap sharing scheme according to an embodiment of the disclosure.

FIG. 8 shows another example of deriving carrier-specific scaling factors for measuring a set of frequency layers F81-F85 with a gap sharing scheme according to an embodiment of the disclosure. Five sequences of SMTC occasions 801-805 are shown in FIG. 8 corresponding to the five frequency layers F81-F85 and denoted A, B, C, D, and E, respectively. Each column 806 of SMTC occasions corresponding to a measurement gap belonging to a gap pattern with a periodicity of 20 ms. The frequency layers F81, F82, F84, and F85 are inter-frequency/inter-RAT layers, and are configured with a gap sharing percentage of 75%, from which a gap sharing factor $K_{inter}$=4/3 can be derived. In contrast, the frequency layer F83 is an intra-frequency layer, and configured with a gap sharing percentage of 25%, from which a gap sharing factor $K_{intra}$=4 can be derived.

The layers 801-805 each have, in form of (periodicity, offset), an SMTC of (160 ms, 0), (80 ms, 0), (40 ms, 0), (40 ms, 20 ms), and (20 ms, 0), respectively, and thus are categorized into types from type 1 to type 5. The 5 types form a graph 810 as shown in FIG. Based on the graph 810, eight paths 811-818 can be identified corresponding to 8 gap occasion patterns: pattern I {A, B, C, E}, pattern II {B, C, E}, pattern III {C, E}, pattern IV {C, E}, and patterns V-VIII having a same pattern of {D, E}.

Based on the gap sharing parameters $K_{inter}$ and $K_{intra}$, the gap occasions in FIG. 8 can be scheduled in the a way similar to the FIG. 7 example. For example, to-be-measured candidate MOs in each of the gap patterns I-IV (corresponding to the path 811-814 in the graph 810) include both inter-frequency/inter-RAT MOs and the intra-frequency MO, and thus the gap sharing scheme would be applied in gap patterns I-IV. In contrast, the gap sharing scheme is not applied in the gap patterns V-VIII that include only inter-frequency layers.

In an embodiment, based on the above scheduling method and the identified gap occasion patterns I-VIII, the measurement scaling factors for each frequency layer F81-F85 can be determined in a way similar to the FIG. 7 examples. For example, the frequency layers F81-F85 (MOs) can first be grouped into a first group of inter-frequency/inter-RAT MOs {F81, F82, F84, F85} and a second group of intra-frequency MOs {F83}. Then, the scaling factors of the two groups are determined separately.

For example, the target inter-frequency layer F81 belongs to one gap occasion pattern, pattern I {A, B, C, E}. The inter-frequency layers in this gap occasion pattern, A, B, and E, equally share the gap sharing percentage of 75%, and thus each have a measured probability of 1/4. Accordingly, the scaling factor of the layer F81 is 4.

For example, the target inter-frequency layer F82 belongs to two gap occasion patterns, pattern I {A, B, C, E} and pattern II {B, C, E}. In pattern I, the group of inter-frequency layers in this gapoccasion pattern, A, B, and E, equally share the gap sharing percentage of 75%, and thus the layer F82 (corresponding to B) has a measured probability of 1/4. In pattern II, the group of inter-frequency layers of B and E equally share the gap sharing percentage of 75%, thus the target layer F82 (corresponding to B) has a measured probability of 3/8. An average of the two measured probabilities in pattern I and II is 5/16. Thus, the scaling factor of the target layer F82 is 16/5. The inter-frequency layer F84 belongs to gap occasion patterns V-VIII that include only inter-frequency layers, so gap sharing factors does not apply to these gap occasion patterns and measured probability of each gap occasion pattern is 1/2. An average of 4 measured probabilities is still 1/2, thus the scaling factor of the target layer F84 is 2. The inter-frequency layer F85 belongs to all gap occasion patterns I-VIII, where gap sharing factors apply in gap occasion patterns I-IV and does not apply in gap occasion patterns V-VIII. In a similar way, the measured probabilities of gap occasion patterns I-VIII are 1/4, 3/8, 3/4, and 3/4. The measured probabilities of gap occasion patterns V-VIII are all equal to 1/2. An average of the 8 measured probabilities in patterns I-VIII is 33/64, thus the scaling factor of the target layer F85 is 64/33.

For example, the target intra-frequency layer F83 belongs to four gap occasion patterns, and share the gap sharing percentage 25% in each of the four patterns. The layer F83 has a measured probability of 25% in each one gap pattern. An average of the 4 measured probabilities in patterns I-IV is still 1/4, thus the scaling factor of target layer F83 is 4.

In above examples, measured probabilities of respective gap occasion patterns are averaged to determine a carrier-specific scaling factor of a target MO. In some other embodiments, in order to simplify the derivation of the scaling factors, a minimum measured probability of a target MO in a sequence of gap occasions over a predetermined period is used as the basis for determining a measurement delay factor of the target MO. As a result, a relaxed measurement delay requirement can be obtained compared with that obtained based on averaging measured probabilities in different gap occasion patterns.

In an embodiment, when no gap sharing is applied, a sequence of gap occasions in a predetermined period is investigated. For example, the predetermined period can be a period at least within which all possible gap occasion patterns are present. For example, numbers of candidate MOs in each gap occasion where the target MO is also a candidate can be counted. As the equal-probability scheduling method is adopted, the gap occasion with the maximum number of candidate MOs observes a minimum measured probability of the target MO that is an inverse of the maximum number. Accordingly, the maximum number among the numbers of candidate MOs in each counted gap occasion is used as the scaling factor of the target MO.

In an embodiment, when gap sharing is applied, intra-frequency MOs and inter-frequency/inter-RAT MOs are separately considered over a sequence of gap occasions in a predetermined period. For a target intra-frequency MO, numbers of candidate intra-frequency MOs in the gap occasions where the target MO is also a candidate can be counted. Then, among the counted numbers, the numbers of the gap occasions observing both inter-frequency/inter-RAT and intra-frequency candidate MOs are multiplied by a gap sharing factor Kintra. A maximum number among the counted numbers multiplied by Kintra and the rest of counted numbers (not multiplied by Kintra) can be determined to be the scaling factor of the target intra-frequency MO.

Similarly, for a target inter-frequency/inter-RAT MO, numbers of candidate inter-frequency/inter-RAT MOs in the gap occasions where the target MO is also a candidate can be counted. Then, among the counted numbers, the numbers of the gap occasions observing both inter-frequency/inter-RAT and intra-frequency candidate MOs are multiplied by a gap sharing factor $K_{inter}$. A maximum number among the counted numbers multiplied by $K_{inter}$ and the rest of counted numbers (not multiplied by $K_{inter}$) can be determined to be the scaling factor of the target intra-frequency MO.

Figure 9:
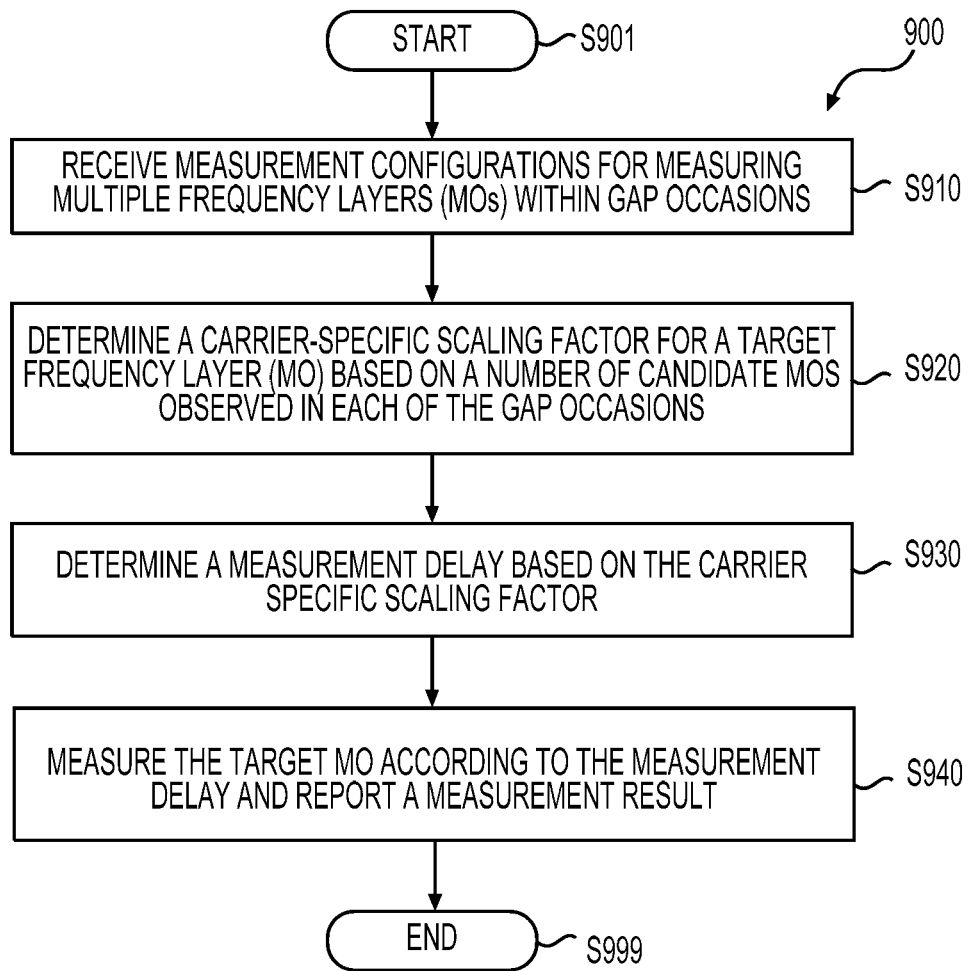
FIG. 9 shows a flowchart of a process 900 for measuring multiple MOs with gaps according to an embodiment of the disclosure.

FIG. 9 shows a flowchart of a process 900 for measuring multiple MOs with gaps according to an embodiment of the disclosure. During the process 900, a carrier-specific scaling factor can be determined, and a measurement can be performed satisfying a measurement period requirement determined based on the carrier-specific scaling factor. The FIG. 1 example is used as an example for explanation of the process 900. The process 900 can start from S901 and proceeds to S910.

At S910, a measurement configuration (e.g., the measurement configurations 140) can be received at the UE 110 from the serving cell 130. The measurement configuration can indicate a set of frequency layers (MOs) each configured with SMTC occasions, and a measurement gap pattern including a sequence of gap occasions. The MOs are to be measured based on the gap occasions and the SMTC occasions. The MOs can include intra-frequency MOs to be measured with or without gaps and/or inter-frequency/inter-RAT MOs. In addition, the measurement configuration may indicate measurements of the MOs can be performed periodically, in an event-triggered manner, or the like.

At S920, a carrier-specific scaling factor can be determined for a target frequency layer or MO based on a number of candidate MOs observed in each of the gap occasions. Due to configurations of the SMTC occasions and the gap occasions, each gap occasion may observe different numbers and different types (e.g., inter-frequency, inter-frequency, or inter-RAT) of candidate MOs. Thus, the scaling factor of the target MO can be determined according to the candidate MOs in the gap occasions where the target MO is also a candidate MO. The techniques and methods described herein can be employed for determining the scaling factor of the target MO. Ceiling operations may be used during the calculation of carrier-specific scaling factor.

At S930, a measurement delay (or period) can be determined based on the carrier specific scaling factor determined at S920. For example, an original measurement delay may be extended to obtain the measurement delay.

At S940, the target MO can be measured according to the measurement delay determined at S930. For example, a measurement of the target MO (e.g., RRM measurement) can be performed within a period indicated by the measurement delay. In some examples, a period, referred to as identification period, can be determined that may include a synchronization time for synchronizing with the frequency layer of the target MO, and optionally a SSB index detection time when the UE 110 is indicated to report with SSB indices in addition to the measurement delay determined at S930. The UE 110 may try to perform a measurement of the target MO within this identification period. After the measurement, the UE 110 may report measurement results (e.g., the measurement report 142) to the serving cell 130. The process 900 may proceed to S999 and terminates at S999.

Figure 10:
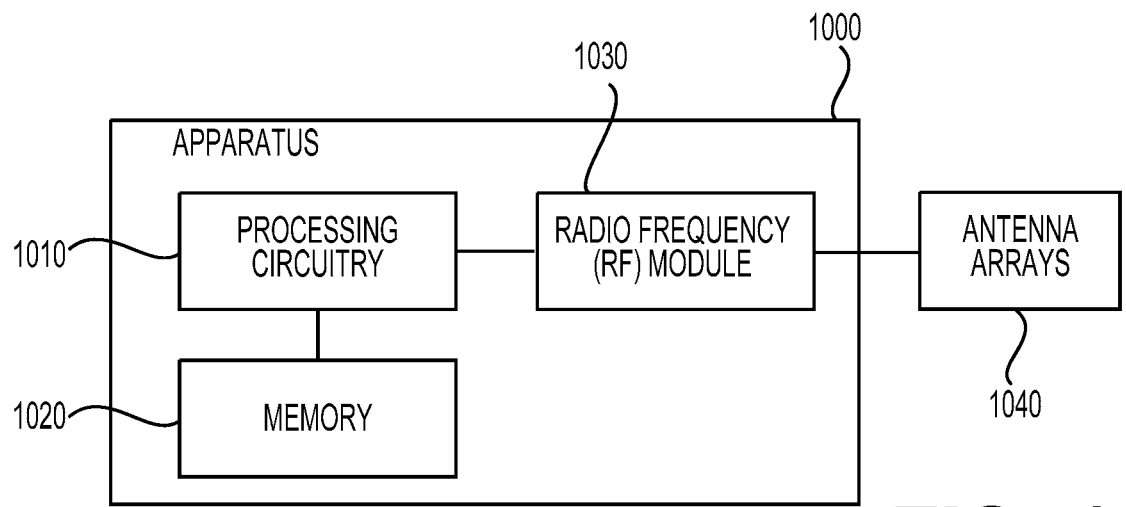
FIG. 10 shows an exemplary apparatus 1000 according to embodiments of the disclosure.

FIG. 10 shows an exemplary apparatus 1000 according to embodiments of the disclosure. The apparatus 1000 can be configured to perform various functions in accordance with one or more embodiments or examples described herein. Thus, the apparatus 1000 can provide means for implementation of techniques, processes, functions, components, systems described herein. For example, the apparatus 1000 can be used to implement functions of the UE 110 or one of the BSs 120-124 in various embodiments and examples described herein. The apparatus 1000 can include a general purpose processor or specially designed circuits to implement various functions, components, or processes described herein in various embodiments. The apparatus 1000 can include processing circuitry 1010, a memory 1020, and a radio frequency (RF) module 1030.

In various examples, the processing circuitry 1010 can include circuitry configured to perform the functions and processes described herein in combination with software or without software. In various examples, the processing circuitry 1010 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1010 can be a central processing unit (CPU) configured to execute program instructions to perform various functions and processes described herein. Accordingly, the memory 1020 can be configured to store program instructions. The processing circuitry 1010, when executing the program instructions, can perform the functions and processes. The memory 1020 can further store other programs or data, such as operating systems, application programs, and the like. The memory 1020 can include non-transitory storage media, such as a read only memory (ROM), a random access memory (RAM), a flash memory, a solid state memory, a hard disk drive, an optical disk drive, and the like.

In an embodiment, the RF module 1030 receives a processed data signal from the processing circuitry 1010 and converts the data signal to beamforming wireless signals that are then transmitted via antenna arrays 1040, or vice versa. The RF module 1030 can include a digital to analog convertor (DAC), an analog to digital converter (ADC), a frequency up convertor, a frequency down converter, filters and amplifiers for reception and transmission operations. The RF module 1030 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 1040 can include one or more antenna arrays.

The apparatus 1000 can optionally include other components, such as input and output devices, additional or signal processing circuitry, and the like. Accordingly, the apparatus 1000 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   receiving measurement configurations for measuring serving/neighboring cells at a user equipment (UE) in a wireless communication system, the measurement configurations indicating
   (i) multiple measurement objects (MOs) each with a synchronization signal block (SSB) measurement timing configuration (SMTC) specifying a sequence of SMTC occasions within which SSBs of the corresponding MO are present, and (ii) a sequence of gap occasions within which the UE is scheduled to perform measurement operation, wherein a target MO in the multiple MOs is measureable by the UE within a portion of the gap occasions that overlaps the SMTC occasions of the target MO;

determining a carrier-specific scaling factor for the target MO based on a number of candidate MOs measureable by the UE in each gap occasion that overlaps the SMTC occasions of the target MO;

determining a measurement period for measuring the target MO according to the carrier-specific scaling factor; and performing measurement of the target MO within the determined measurement period.

2. The method of claim 1, wherein the multiple MOs include:
a first intra-frequency MO to be measured with no measurement gap;
a second intra-frequency MO to be measured with measurement gaps;
an inter-frequency MO; or
an inter-radio access technology (RAT) MO.

3. The method of claim 1, wherein the determining the carrier-specific scaling factor for the target MO includes:
when the measurement configurations indicate a no gap sharing scheme or an equal splitting for gap sharing, determining the carrier-specific scaling factor for the target MO according to a gap scheduling method that includes measuring the candidate MOs in each gap occasion of the portion of the gap occasions with equal probability.

4. The method of claim 1, wherein the determining the carrier-specific scaling factor for the target MO includes:
when the measurement configurations indicate a no gap sharing scheme or an equal splitting for gap sharing, determining a number of the candidate MOs in one of the portion of the gap occasions to be the carrier-specific scaling factor for the target MO, the one of the portion of the gap occasions including a maximum number of candidate MOs among the portion of the gap occasions where the target MO is a candidate MO.

5. The method of claim 1, wherein the determining the carrier-specific scaling factor for the target MO includes:
when the measurement configurations indicate a gap sharing scheme with gap sharing factors,
determining the carrier-specific scaling factor for the target MO according to a gap scheduling method that includes applying the gap sharing factors to first gap occasions each including at least an intra-frequency MO and at least an inter-frequency or inter-radio access technology (RAT) MO, and not applying the gap sharing factors to second gap occasions each including only intra-frequency MOs or only inter-frequency and inter-RAT MOs.

6. The method of claim 5, wherein the gap scheduling method further includes:
in each of the first gap occasions, the intra-frequency MO(s) equally sharing a first percentage of measurement opportunities, and the inter-frequency or inter-RAT MO(s) equally sharing a second percentage of the measurement opportunities.

7. The method of claim 6, wherein the determining carrier-specific scaling factor for the target MO according to the gap scheduling method includes:

when the target MO is an intra-frequency MO,
counting a respective one of first numbers of intra-frequency MOs in each gap occasion of the first gap occasions where the target MO is a candidate MO;
counting a respective one of second numbers of intra-frequency MOs in each gap occasion of the second gap occasions where the target MO is a candidate MO; and
determining a third number to be the carrier-specific scaling factor for the target MO, the third number being a maximum number in a group of numbers including the second numbers and including the first numbers each multiplied by an inverse of the first percentage.

8. The method of claim 6, wherein the determining the carrier-specific scaling factor for the target MO according to the gap scheduling method comprises:
when the target MO is an inter-frequency MO or inter-RAT MO,
counting a respective one of first numbers of inter-frequency or inter-RAT MOs in each gap occasion of the first gap occasions where the target MO is a candidate MO;
counting a respective one of second numbers of inter-frequency or inter-RAT MOs in each gap occasion of the second gap occasions where the target MO is a candidate MO; and
determining a third number to be the carrier-specific scaling factor for the target MO, the third number being a maximum number in a group of numbers including the second numbers and including the first numbers each multiplied by an inverse of the second percentage.

9. The method of claim 1, wherein the determining the carrier-specific scaling factor for the target MO includes:
identifying a set of gap occasion patterns each corresponding to a different combination of the MOs.

10. The method of claim 9, wherein the determining the carrier-specific scaling factor for the target MO further includes:
when the measurement configurations indicate a no gap sharing scheme or an equal splitting for gap sharing, determining an inverse of an average of a sum of measured probabilities of the target MO in each gap occasion pattern of the gap occasion patterns where the target MO is a candidate MO to be the carrier-specific scaling factor for the target MO.

11. The method of claim 10, wherein one of the measured probabilities of the target MO in a corresponding gap occasion pattern is 1/N, and N is a number of candidate MOs in the corresponding gap occasion pattern.

12. The method of claim 9, wherein the determining the carrier-specific scaling factor for the target MO further includes:
when the measurement configurations indicate a gap sharing scheme and the target MO is an intra-frequency MO,
determining a respective one of first measured probabilities of the target MO in each gap occasion pattern of first gap occasion patterns including at least an intra-frequency MO and at least an inter-frequency or inter-radio access technology (RAT) MO and where the target MO is a candidate MO;
determining a respective one of second measured probabilities of the target MO in each gap occasion pattern of second gap occasion patterns including only inter-frequency or inter-RAT MOs and where the target MO is a candidate MO; and determining an inverse of an averaged measured probability to be the carrier-specific scaling factor of the target MO, the averaged measured probability being an average of a group of values including the second measured probabilities and including the first measured probabilities each multiplied by a first gap sharing percentage indicated by the measurement configurations.

13. The method of claim 9, wherein the determining the carrier-specific scaling factor for the target MO further includes:
when the measurement configurations indicate a gap sharing scheme and the target MO is an inter-frequency or inter-radio access technology (RAT) MO,
determining a respective one of first measured probabilities of the target MO in each gap occasion pattern of first gap occasion patterns including at least an intra-frequency MO and at least an inter-frequency or inter-RAT MO and where the target MO is a candidate MO;
determining a respective one of second measured probabilities of the target MO in each gap occasion pattern of second gap occasion patterns including only inter-frequency or inter-RAT MOs and where the target MO is a candidate MO; and
determining an inverse of an averaged measured probability to be the carrier-specific scaling factor of the target MO, the averaged measured probability being an average of a group of values including the second measured probabilities and including the first measured probabilities each multiplied by a second gap sharing percentage indicated by the measurement configurations.

14. The method of claim 1, wherein the determining the carrier-specific scaling factor for the target MO further includes:
constructing a graph having a tree structure with nodes each representing a type of types the SMTCs, wherein each type of the types corresponds to a possible combination of periodicity and offset parameters of the SMTCs,
the types are arranged in different layers, each layer corresponding to a value of the periodicities of the SMTCs with the layers corresponding to larger SMTC periodicity values arranged in higher layers, and
if MOs corresponding to any two of the types in neighboring layers are candidate MOs in a same gap occasion, the nodes that represent the two types in the neighboring layers are connected with each other in the graph.

15. An apparatus, comprising circuitry configured to:
receive measurement configurations for measuring serving/neighboring cells at a user equipment (UE) in a wireless communication system, the measurement configurations indicating
(i) multiple measurement objects (MOs) each with a synchronization signal block (SSB) measurement timing configuration (SMTC) specifying a sequence of SMTC occasions within which SSBs of the corresponding MO are present, and
(ii) a sequence of gap occasions within which the UE is scheduled to perform measurement operation, wherein a target MO in the multiple MOs is measureable by the UE within a portion of the gap occasions that overlaps the SMTC occasions of the target MO;
determine a carrier-specific scaling factor for the target MO based on a number of candidate MOs measureable by the UE in each gap occasion that overlaps the SMTC occasions of the target MO;
determine a measurement period for measuring the target MO according to the carrier-specific scaling factor; and
perform measurement of the target MO within the determined measurement period.

16. The apparatus of claim 15, wherein the circuitry is further configured to:
when the measurement configurations indicate a no gap sharing scheme or an equal splitting for gap sharing, determine the carrier-specific scaling factor for the target MO according to a gap scheduling method that includes measuring the candidate MOs in each gap occasion of the portion of the gap occasions with equal probability.

17. The apparatus of claim 15, wherein the circuitry is further configured to:
when the measurement configurations indicate a no gap sharing scheme or an equal splitting for gap sharing, determine a number of the candidate MOs in one of the portion of the gap occasions to be the carrier-specific scaling factor for the target MO, the one of the portion of the gap occasions including a maximum number of candidate MOs among the portion of the gap occasions where the target MO is a candidate MO.

18. The apparatus of claim 15, wherein the circuitry is further configured to:
when the measurement configurations indicate a gap sharing scheme with gap sharing factors, determine the carrier-specific scaling factor for the target MO according to a gap scheduling method that includes applying the gap sharing factors to first gap occasions each including at least an intra-frequency MO and at least an inter-frequency or inter-radio access technology (RAT) MO, and not applying the gap sharing factors to second gap occasions each including only intra-frequency MOs or only inter-frequency and inter-RAT MOs.

19. The apparatus of claim 18, wherein the gap scheduling method further includes:
in each of the first gap occasions, the intra-frequency MO(s) equally sharing a first percentage of measurement opportunities, and the inter-frequency or inter-RAT MO(s) equally sharing a second percentage of the measurement opportunities.

20. A non-transitory computer-readable medium storing instructions that, when executed by a processor, cause the processor to perform a method, the method comprising:
receiving measurement configurations for measuring serving/neighboring cells at a user equipment (UE) in a wireless communication system, the measurement configurations indicating
(i) multiple measurement objects (MOs) each with a synchronization signal block (SSB) measurement timing configuration (SMTC) specifying a sequence of SMTC occasions within which SSBs of the corresponding MO are present, and
(ii) a sequence of gap occasions within which the UE is scheduled to perform measurement operation, wherein a target MO in the multiple MOs is measureable by the UE within a portion of the gap occasions that overlaps the SMTC occasions of the target MO;
determining a carrier-specific scaling factor for the target MO based on a number of candidate MOs measureable by the UE in each gap occasion that overlaps the SMTC occasions of the target MO;

determining a measurement period for measuring the target MO according to the carrier-specific scaling factor; and performing measurement of the target MO within the determined measurement period.

* * * * *